(12) United States Patent
Takehisa et al.

(10) Patent No.: US 6,628,682 B1
(45) Date of Patent: Sep. 30, 2003

(54) WAVELENGTH DETECTION DEVICE FOR LINE-NARROWED LASER APPARATUS AND ULTRA LINE-NARROWED FLUORINE LASER APPARATUS

(75) Inventors: Kiwamu Takehisa, Hiratsuka (JP); Kouji Shio, Hiratsuka (JP); Shinji Nagai, Hiratsuka (JP); Yasuaki Iwata, Hiratsuka (JP); Osamu Wakabayashi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 286 days.

(21) Appl. No.: 09/716,411

(22) Filed: Nov. 21, 2000

(30) Foreign Application Priority Data

Dec. 7, 1999 (JP) .......................... 11-347635
Nov. 29, 1999 (JP) .......................... 11-337948

(51) Int. Cl.⁷ .................................. H01S 3/13
(52) U.S. Cl. ................................. 372/29.022; 372/57
(58) Field of Search ............................ 372/20, 29.022; 356/326, 320, 352

(56) References Cited

U.S. PATENT DOCUMENTS 5,373,515 A * 12/1994 Wakabayashi et al. ......... 372/20
5,835,520 A * 11/1998 Das et al. ...................... 372/57
6,160,832 A * 12/2000 Kleinschmidt et al. ........ 372/57
6,243,163 B1 * 6/2001 Wakabayashi et al. ....... 356/326

* cited by examiner

Primary Examiner—Paul Ip
Assistant Examiner—Dung Nguyen
(74) Attorney, Agent, or Firm—Varndell & Varndell, PLLC

(57) ABSTRACT

Of spontaneous emission beams emitted from a laser medium but not line-narrowed, a spontaneous emission beam whose wavelength approximates a narrowed emission beam and whose light intensity is equal to or higher than a certain level is used as a reference light.

8 Claims, 25 Drawing Sheets

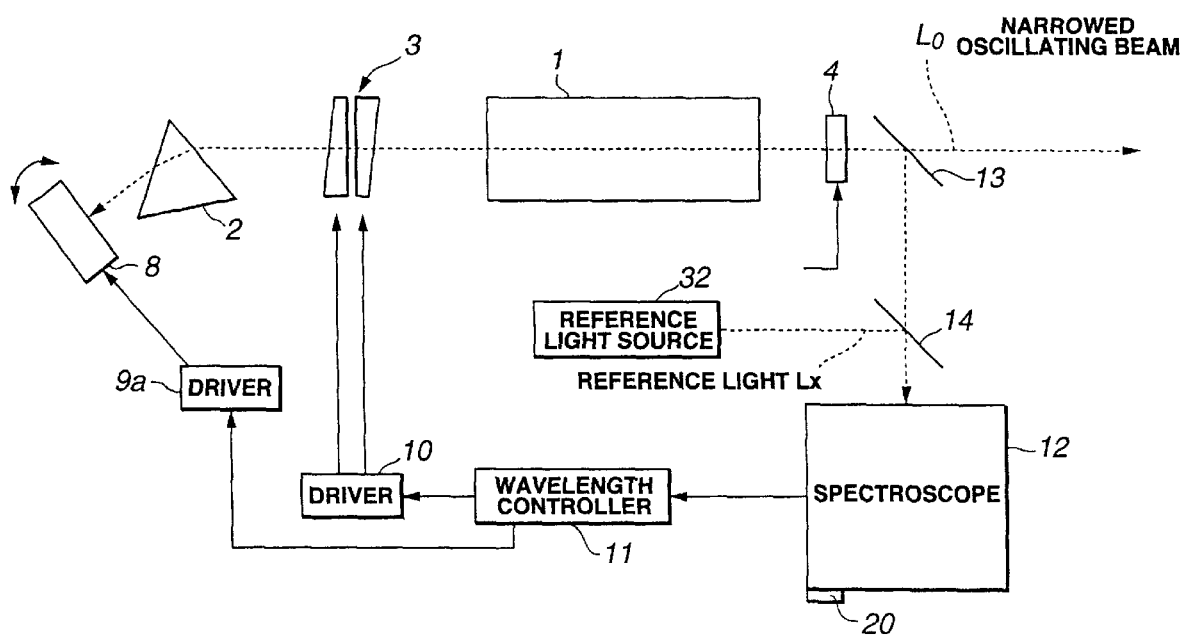
FIG. 27 *PRIOR ART*

WAVELENGTH DETECTION DEVICE FOR LINE-NARROWED LASER APPARATUS AND ULTRA LINE-NARROWED FLUORINE LASER APPARATUS

BACKGROUND OF THE INVENTION

1. Field of the Invention

This invention relates to a wavelength detection device for a line-narrowed laser apparatus and to a line-narrowed laser apparatus. More specifically, the present invention relates to a wavelength detection device that is ideal for detecting wavelengths in line-narrowed laser light spectrums. The present invention also relates to an ultra line-narrowed fluorine laser apparatus that narrows the line of the laser light of a fluorine laser and provides it as an exposure light source for an exposure apparatus.

2. Description of the Related Art

In cases where laser light is used as the light source in a stepper (reduction projection exposure device), it is necessary to narrow the line of the laser light spectrum by a line narrowing element such as an etalon or grating.

It is also necessary that the center wavelength in the spectrum of this line-narrowed oscillation line be stabilized and controlled with high precision so that there is no divergence during exposure.

In FIG. 27 is diagrammed a common laser wavelength stabilizing control device.

The line narrowing and wavelength selecting are performed by driving an etalon 3 that is a line narrowing element by a wavelength controller 11 through a driver 10 (regulating the installation angle of the etalon 3), and driving a fully reflective mirror 8 by the wavelength controller 11 through a driver 9a (regulating the installation angle of the fully reflective mirror 8).

The wavelength is controlled so that the center wavelength of the narrowed oscillation line L0 does not fluctuate during the exposure.

That is, during the exposure, the absolute wavelength of the line-narrowed oscillation line L0 is detected by detecting the relative wavelength of the line-narrowed oscillation line L0 relative to a constant reference beam Lx.

In other words, the laser beam output from a reference light source 32 is input as the reference light Lx to a spectroscope 12. The narrowed oscillation line L0 for which it is desired to detect the wavelength is simultaneously input, as the light to be detected L0, via beam splitters 13 and 14, to the same spectroscope 12. In the spectroscope 12, the reference light Lx and the light to be detected L0 are subjected to spectral diffraction, and an image of the diffracted light is formed on a line sensor 20. The detection position on the line sensor 20 corresponds to the detected wavelength.

Then, using a dispersion value, from the difference in the positions detected on the line sensor 20, the relative wavelength of the light to be detected L0 relative to the reference light Lx is found, whereupon, based on that found relative wavelength and the known wavelength of the reference light Lx, the absolute wavelength of the light to be detected L0 is calculated.

These calculation results are next fed back to the wavelength controller 11, and, thereby, the etalon 3 is driven by the driver 9e.

The center wavelength of the narrowed oscillation line. L0 that is made to oscillate between the fully reflecting mirror 8 and the output mirror 4 through the laser chamber 1 and etalon 3 is then fixed as the targeted wavelength.

In this manner, stabilizing control is effected with high precision so that the center wavelength in the narrowed oscillation line L0 does not diverge during exposure.

With the conventional laser wavelength stabilizing control device, however, a problem is incurred in that the structure becomes complex due to the necessity of the reference light source 32 for outputting the reference light Lx, as described above. When the wavelength of the narrowed oscillation line L0 is detected with high precision, furthermore, a problem is incurred in that the light intensity of the laser beam output by the lamp used for the reference light source is low.

Thereupon, in Japanese Patent Application Laid-Open No. 5-95154, as published, for example, an invention is described wherewith, when the narrowed oscillation line L0 is a molecule fluorine $F_2$ laser beam, an atom fluorine laser beam is used having a wavelength in the visible region.

Based on the invention described in this publication, it is possible not to provide a reference light source in the wavelength stabilizing control device.

With the invention described in the publication noted above, the wavelength of the fluorine atom laser oscillation line used as the reference light Lx is in the visible light region. That is, the wavelength of an atom fluorine laser beam is in a region that is removed from the vacuum ultraviolet region that contains the wavelength of a molecule fluorine laser.

For this reason, when the narrowed oscillation line L0 is a molecule fluorine laser beam, the precision wherewith the wavelength of the narrowed oscillation line L0 is detected will decline when detected on the basis of the wavelength of the molecule fluorine laser beam.

In other words, with the invention described in the publication noted above, a problem is incurred in that it is very difficult to effect stabilizing control with high precision on the center wavelength of the spectrum of the narrowed oscillation line L0.

With the invention described in the publication noted above, moreover, a dielectric multilayer film mirror is employed for causing fluorine atom laser light and molecule fluorine laser light to oscillate simultaneously, providing a resonator for causing the fluorine atom laser light to oscillate inside the resonator for causing the molecule fluorine laser light to oscillate, for example.

With such a mirror, the number of layers becomes large, and a film material must be used which exhibits high absorbency for light having a wavelength of 157 nm, wherefore problems are incurred in that the molecule fluorine laser light oscillation efficiency becomes poor, and the output of the narrowed oscillation line L0 from the molecule fluorine laser light declines.

A first object of the present invention, which was devised with the situation described in the foregoing in view, is to improve the precision wherewith the wavelength of a narrowed oscillation line is detected, without using a reference light source, and without causing a decline in the narrowed oscillation line output.

Now, in terms of the performance demanded in an exposure tool used in lithography, there are many different factors, such as resolution, alignment precision, processing power, and equipment reliability. Among these factors, the resolution R that directly impacts pattern fineness is expressed by the formula $R = k \cdot \lambda / NA$ (where k is a constant, λ is the exposure light wavelength, and NA is the numerical aperture of the projection lens). Accordingly, the shorter the exposure light wavelength λ the better in the interest of obtaining good resolution.

Thereupon, in a conventional exposure tool, a mercury lamp i line (wavelength=365 nm) or a krypton-fluoride (KrF) excimer laser having a wavelength of 248 nm is used as the exposure tool light source. These are called an i-line exposure tool and KrF exposure tool, respectively. For the projection optical system employed in such an i-line exposure tool or KrF exposure tool, a reduction projection lens unit wherein a larger number of quartz glass lenses are assembled together is widely used.

As a next-generation exposure tool for performing ultra-fine processing, moreover, use is beginning to be made of exposure tools which employ an argon-fluoride (ArF) excimer laser having a wavelength of 193 nm for the exposure light source. These are called ArF exposure tools. In the ArF exposure tool, an ArF excimer laser is used which has its line-narrowed down to a wavelength width of approximately 0.6 pm, and an achromatic lens made of two types of material is used in the reduction projection optical system.

For the next generation of lithographic exposure tools for the ArF exposure tools described above, furthermore, research is being done on fluorine exposure tools wherein a fluorine laser having a wavelength of 157 nm is used for the light source.

In this fluorine laser, there are two oscillation lines (also called oscillation lines) having different wavelengths and light intensities. The two wavelengths are λ1=157.6299 nm and λ2=157.5233 nm, respectively, with the wavelength width of each oscillation line the to be on the order of 1 to 2 pm.

In order to use this fluorine laser as exposure light, it is generally believed to be advantageous to select only one line having greater intensity (λ1=157.6299 nm) (hereinafter called single-line implementation). For this single-line implementation, conventionally, one or two prisms are used.

Furthermore, double-line fluorine laser implementation is described, for example, in "CAN. J. PHYS. VOLUME. 63, 1985, pp 217–218."

Also, the results of experimentation in single-line fluorine laser implementation are reported, for example, in SPIE, 24th International Symposium on Microlithography, February 1999."

In the conventional fluorine exposure tools noted in the foregoing, however, it becomes very difficult to employ the refractive type reduction projection optical systems based solely on lenses that had been commonly used in exposure tools theretofore (that is, until the development of the ArF exposure tools). It is to be necessary to use instead a reflective-refractive type (also called a catadioptric type) that is effective against chromatic aberration.

The reason therefor is that, at a wavelength of 157 nm, the transmittance in quartz glass becomes extremely low, so that only a very limited number of materials such as calcium fluoride can be used.

For that reason, when a reduction projection lens is configured using a monochromatic lens consisting only of calcium fluoride, the level of line narrowing is inadequate even when the fluorine laser is implemented in single line.

Therefore, in reality, it is said that it is necessary to further narrow the band for that single line to a tenth or so of the wavelength width (to approximately 0.2 pm).

Furthermore, in a scheme wherein the single line of a fluorine laser is used as it is, the line spectrum is something that is absolutely established optically, wherefore, while there is no need to stabilize the wavelength, when the single line is subjected to line narrowing down to a wavelength width of approximately 0.2 pm or so, it is necessary to effect stabilization so that the line-narrowed wavelength does not flutter within the spectrum of the single line having a wavelength width of 1 to 2 pm.

Conventionally, however, it is very difficult to use other light sources or absorption lines that have a wavelength that is stabilized in the vicinity of the 157 nm wavelength, wherefore it has been very difficult to stabilize the wavelength of line-narrowed laser light.

A second object of the present invention is to further narrow the single line having a wavelength width of 1 to 2 pm while also stabilizing the wavelength of that line-narrowed laser light in a simple manner without using a reference light source.

SUMMARY OF THE INVENTION

Thereupon, a first invention, for attaining the first object noted earlier, is a wavelength detection device for detecting, on the basis of a wavelength of a reference light, a wavelength of a narrowed oscillation line output from a line-narrowed laser apparatus in which are deployed a laser medium and a line narrowing element, wherein:

of non-line-narrowed spontaneous emission beams emitted from the laser medium, a spontaneous emission beam whose wavelength approximates the narrowed oscillation line and whose light intensity is a certain level or higher, is used as the reference light.

A second invention, for attaining the first object noted earlier, is a wavelength detection device for detecting, on the basis of a wavelength of a reference light, a wavelength of a narrowed oscillation line output from a line-narrowed oscillating molecule fluorine laser apparatus in which are deployed a line narrowing element and a laser chamber for emitting molecule fluorine emission beams, wherein:

the wavelength detection device comprises emission beam detection means for detecting non-line-narrowed molecule fluorine emission beams emitted from the laser chamber; and one, or, alternatively, two of the molecule fluorine emission beams detected by the emission beam detection means are used as the reference light.

The first invention and the second invention cited above are described in correspondence with FIG. 1, FIG. 2, and FIG. 8.

That is, based on the first invention and the second invention, prior to the line narrowing of the molecule fluorine emission beams L1 and L2, for example, the molecule fluorine emission beams L1 and L2 are detected, and one or, alternatively, two of those detected molecule fluorine emission beams L1 and L2 are used as the reference light L.

In the-first invention and the second invention, as noted above, provision is made so, that emission beams L that have not been subjected to line narrowing are detected, and, of those detected emission, beams L, the emission beam L the wavelength whereof approximates the narrowed oscillation line L0 and the light intensity whereof is at or higher than a certain level is used as the reference light. Therefore the precision wherewith the wavelength of the narrowed oscillation line is detected can be improved without reducing the output of the line-narrowed oscillating laser.

A third invention, for attaining the first object noted earlier, is a wavelength detection device for detecting, on the basis of a wavelength of a reference light, a wavelength of a narrowed oscillation line output from a line-narrowed oscillating molecule fluorine laser apparatus in which are deployed a line narrowing element and a laser chamber for emitting molecule fluorine emission beams, wherein:

the wavelength detection device comprises:

time setting means for setting a certain time period; and light interruption means for interrupting non-line-narrowed molecule fluorine emission beams emitted from the laser chamber for the certain time period set by the time setting means; and wherein:

one or, alternatively, two of the molecule fluorine emission beams interrupted by the light interruption are used as the reference right.

The third invention cited above is described in correspondence with FIG. 2, FIG. 10, and FIG. 12.

That is, based on the third invention, a certain time period is set, the molecule fluorine emission beams L1 and L2 are interrupted for the certain time period that is set before they are input to a line narrowing element 3, and one or, alternatively, two of the molecule fluorine emission beams L1 and L2 at the time of being interrupted are used as the reference light L.

Thus, in this third invention, provision is made so that a certain time period is set, the molecule fluorine emission beams L1 and L2 are interrupted for the certain time period that is set before they are input to a line narrowing element 3, and one or, alternatively, two of the molecule fluorine emission beams L1 and L2 at the-time of being interrupted are used as the reference light L. Therefore the precision wherewith the wavelength of the narrowed oscillation line is detected can be improved without using a reference light source and without lowering the output of the narrowed emission beams.

A fourth invention, for attaining the first object noted earlier, is a wavelength detection device for detecting, on the basis of a wavelength of a reference light, a wavelength of a narrowed oscillation line output from a line-narrowed oscillating molecule fluorine laser apparatus in which are deployed a line narrowing element and a laser chamber for emitting molecule fluorine emission beams, wherein:

the wavelength detection device comprises:

time setting means for setting a certain time period; and installation angle changing means for changing, during the certain time set by the time setting means only, an installation angle of the line narrowing element, from an installation angle at which spectrum of output beam of the molecule fluorine laser is line-narrowed to an installation angle at which the molecule fluorine laser oscillation line is not line-narrowed; and wherein:

one or, alternatively, two of the molecule fluorine laser emission beams output from the laser chamber are used as the reference light when the installation angle of the line narrowing element has been changed by the installation angle changing means to the installation angle whereat the molecule fluorine laser emission beam is not line-narrowed.

The fourth invention cited above is described in correspondence with FIG. 2, FIG. 14, and FIG. 16.

That is, based on this fourth invention, a certain time period is set, and the installation angle of the line narrowing element 3 is changed, for the set certain time, from an installation angle whereat the molecule fluorine laser emission beams L1 and L2 are line-narrowed to an installation angle whereat the molecule fluorine laser emission beams L1 and L2 are not line-narrowed, and, at that time, one or, alternatively, two of the molecule fluorine laser emission beams L1 and L2 output from the laser chamber 1 are used as the reference light L.

Thus, with this fourth invention, provision is made so that a certain time interval is set, and one or, alternatively, two of the molecule fluorine laser emission beams L1 and L2 output from the laser chamber 1 are used as the reference light L when the installation angle of the line narrowing element 3 is changed, during the certain set time period, from an installation angle whereat the molecule fluorine laser emission beams L1 and L2 are line-narrowed to an installation angle whereat the molecule fluorine laser emission beams L1 and L2 are not line-narrowed. Therefore the precision wherewith the wavelength of the narrowed oscillation line is detected can be improved without using a reference light source and without lowering the output of the narrowed emission beams.

A fifth invention, for attaining the second object noted earlier, is an ultra line-narrowed fluorine laser apparatus for line narrowing laser light which is laser-oscillated, comprising a laser chamber for laser-oscillating a fluorine laser; and a first resonator for causing the laser light oscillated by the laser chamber to resonate; wherein:

the ultra line-narrowed fluorine laser apparatus further comprises:

a line narrowing element for line narrowing and outputting one of two oscillation lines having different wavelengths and light intensities in the laser-oscillated laser light;

a second resonator for causing the one oscillation line to oscillate without being line-narrowed;

detection means for detecting a difference between a center wavelength in spectrum of laser light output from the line narrowing element and a center wavelength in spectrum of laser light oscillated from the second resonator; and control means for controlling the line narrowing element so that the difference in the center wavelengths in spectrums of the two laser lights detected by the detection means falls within an allowable range.

A sixth invention is the fifth invention wherein: the detection means comprises a spectroscope for receiving laser light output from the line narrowing element and laser light oscillated by the second resonator, and measuring spectrums of those two laser lights; and the spectroscope detects a wavelength of spectrum of laser light output from the line narrowing element, also detects a wavelength of spectrum of laser light oscillated from the second resonator, and detects the difference between the center wavelengths of these two spectrums.

And a seventh invention is the sixth invention wherein the spectroscope has a scanning Fabry-Perot etalon.

The fifth to seventh inventions are next described with reference to FIG. 18 and FIGS. 19(a) and 19(b).

As diagrammed in FIG. 18, in an ultra line-narrowed fluorine laser apparatus 600, a first resonator is configured with a fully reflecting mirror 8 and an output mirror 4, while a second resonator is configured with a fully reflecting mirror 32 and the front surface P of a prism 33a.

The first resonator is a stabilized type, and within this stabilized type of first resonator is deployed a laser chamber 1.

In the first resonator, an etalon 56 is deployed between the fully reflecting mirror 8 and the laser chamber 1, and oscillation lines are further line-narrowed (that is, ultra line-narrowed) by this etalon 56.

In the etalon 56, centered on a strong line having a wavelength λ1=1.57.6299 nm, the maximum transmittance wavelengths thereof are matched, wherefore, when laser oscillation is induced, a laser beam L10 that is ultra line-narrowed to a wavelength width of approximately 0.2 pm at the wavelength λ1=157.6299 is obtained from the output mirror 4.

Meanwhile, the second resonator is a stabilized type, wherein, because no line narrowing element is contained in this second resonator, the two fluorine laser lines are oscillated as is.

The Laser beam L12 containing the two lines output from this second resonator, while advancing through the two prisms 33*a* and 33*b*, will have two slight angular differences arise in the direction of advance of the two lines, respectively, due to wavelength dispersion.

Here, in the laser light containing the two lines reflected to the mirror 35, a laser beam L13 having one line (line having wavelength λ1=157.6299 nm) is set so that it passes through a pinhole 34*b*.

The spectroscope 37 is configured by a scanning Fabry-Perot etalon (not shown) and a piezo element (not shown) that changes the gap interval in that etalon. The spectroscope 37 inputs both the ultra line-narrowed laser beam L11 having the wavelength λ1 of 157.6299 nm and the laser beam L13 that is not ultra line-narrowed having the wavelength λ1 of 157.6299 nm, detects the spectrums of those laser beams, respectively (cf. FIGS. 19(*a*) and 19(*b*)), and sends the detection results to a control unit 40.

The control unit 40, based on the detection results from the spectroscope 37, controls the turning of a turning stage 41 via a signal line 39*b*, in order to stabilize the center wavelength in the spectrum of the ultra line-narrowed laser beam L11, so as to cause the center wavelength in the wide spectrum of the laser beam L13 that is not ultra line-narrowed (i.e. the absolute wavelength thereof) to coincide with the center wavelength in the spectrum of the ultra line-narrowed laser beam L11.

As described in the foregoing, based on the fifth and sixth inventions, control is effected so that the difference between the center wavelength in the spectrum of the laser beam that is not ultra line-narrowed and the center wavelength in the spectrum of the ultra line-narrowed laser beam falls within an allowable range that is set beforehand (that is, so that the center wavelengths of the two spectrums coincide, for example). Therefore, the center wavelength in the spectrum of the ultra line-narrowed laser beam can be definitely stabilized without using a reference light source.

Based on the seventh invention, furthermore, a spectroscope provided in the detection means for detecting the spectrum of laser light for wavelength stabilization is made so that a scanning Fabry-Perot etalon is used. Compared to a spectroscope wherein a diffraction grating is used, therefore, the spectroscope can be made more compact, and a laser apparatus into which this spectroscope is incorporated can also be made more compact.

BRIEF DESCRIPTION OF THE DRAWINGS

FIG. 27 is a diagram of an ordinary laser wavelength stabilizing control unit.

DESCRIPTION OF THE PREFERRED EMBODIMENTS

Embodiment aspects of the wavelength detection device relating to the present invention are now described with reference to the drawings.

In these embodiment aspects, the case is assumed of detecting wavelengths of molecule fluorine laser narrowed oscillation lines.

Applications are also possible, however, in detecting wavelengths of narrowed oscillation lines from argon ion lasers.

That is, the widths of the spontaneous emission beams from these molecule fluorine lasers and argon ion lasers are narrow, being approximately 2 pm and approximately 3 pm, respectively.

In other words, the center wavelength of these spontaneous emission beams can be fairly well specified if the width is narrow at 3 pm or less and the light intensity peak is evident, as in the spontaneous emission beams from these molecule fluorine lasers and argon ion lasers, wherefore they can be used as the reference light when detecting narrowed oscillation lines.

The width of the spontaneous emission beam from an excimer laser, on the other hand, is a wide 450 pm. With a spontaneous emission beam such as this, it is very difficult to specify the center wavelength, wherefore these embodiment aspects should not be applied to the detection of the wavelengths of narrowed oscillation lines from excimer lasers.

Figure 1:
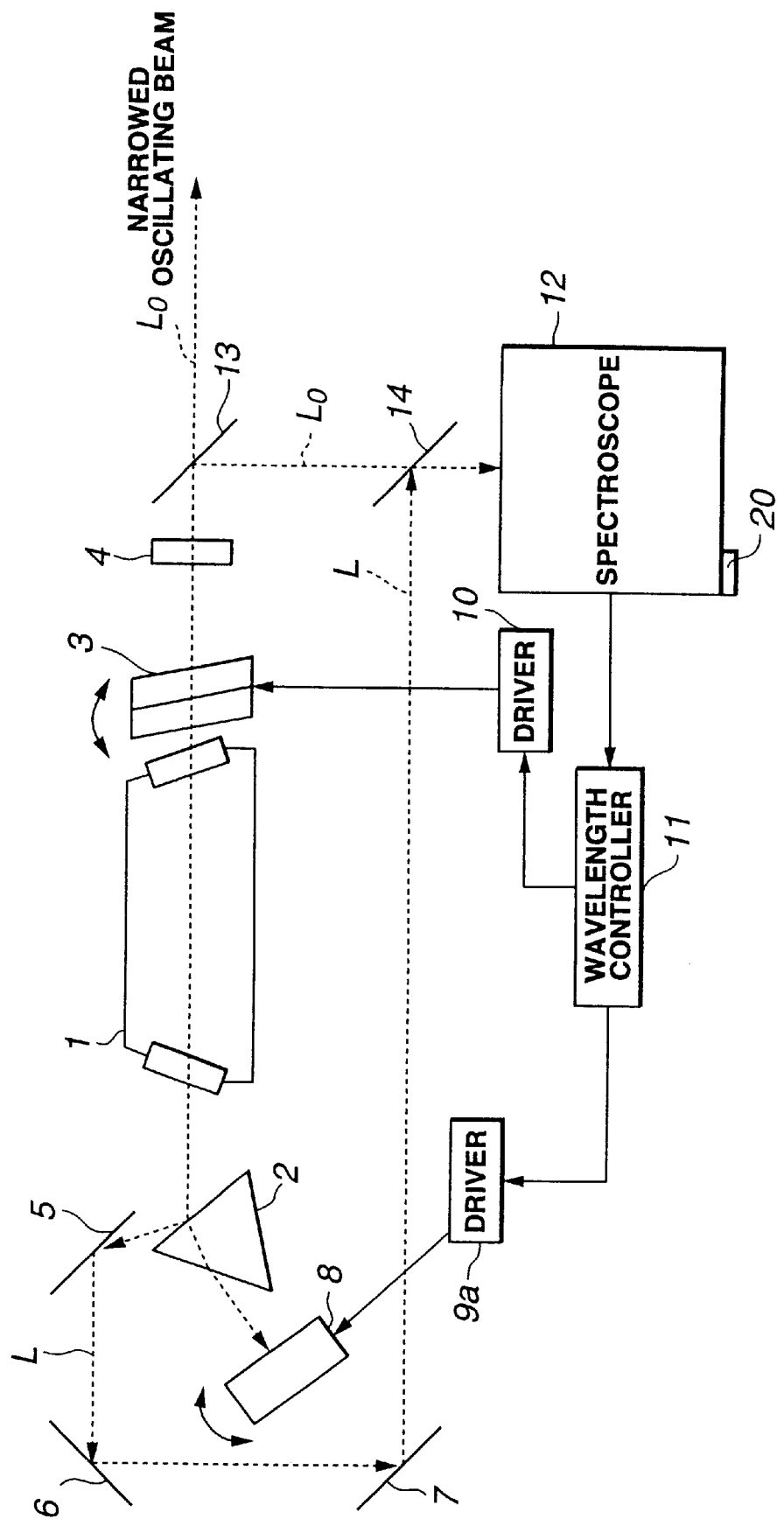
FIG. 1 is a diagram representing the configuration of a wavelength detection device related to a first embodiment aspect.

FIG. 1 is a diagram of the configuration of an embodiment aspect of a wavelength detection device relating to the present invention. In FIG. 1, the same configuring elements as in FIG. 18, discussed earlier, are indicated by the same symbols and further description of those configuring elements is omitted herebelow as expedient.

In this embodiment aspect, mirrors 5, 6, and 7 are deployed so as to reflect light reflected by a prism 2 and guide that light to a beam splitter 14.

According to this embodiment aspect, the spontaneous emission beam emitted by electrical discharge excitation in a laser chamber moves back and forth inside a resonator configured with an output mirror 4 and a fully reflecting mirror 8, with the wavelength thereof selected by the prism 2 and an etalon 3, and is thereby amplified and laser-oscillated.

Figure 2:
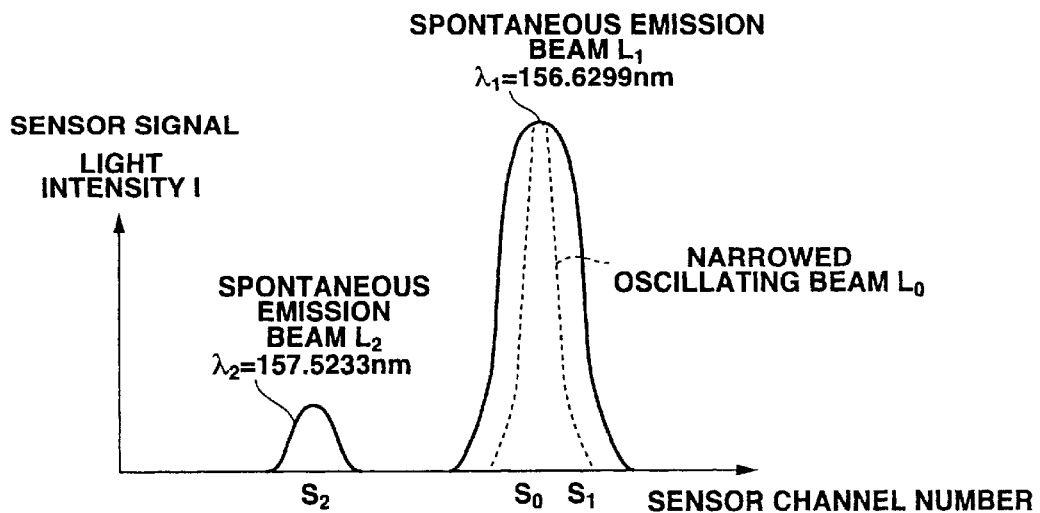
FIG. 2 is diagram representing two emission beams of a molecule fluorine laser on a line sensor.

FIG. 2 is a diagram representing two emission beams from a molecule fluorine laser on a line sensor 20.

As diagrammed in FIG. 2, the molecule fluorine laser has two spontaneous emission beams L1 and L2, with the wavelength $\lambda 1$ of the spontaneous emission beam L1 of strong light intensity I being 157.6299 nm, and the wavelength $\lambda 2$ of the spontaneous emission beam L2 of weak light intensity I being 157.5233 nm.

These two spontaneous emission beams L1 and L2 of the molecule fluorine laser are wavelength-selected by the prism 2 and etalon 3 and made one line.

The narrowed oscillation line L0 indicated by the dashed line results from the spontaneous emission beam of the molecule fluorine laser being line-narrowed by the prism 2 and the etalon 3.

The spontaneous emission beams wavelength-selected and line-narrowed by the prism 2 and etalon 3 in this manner are output from the output mirror 4 as the narrowed oscillation line L0 of prescribed power.

A portion of the spontaneous emission beam output from the laser chamber 1 toward the prism 2 is reflected by the prism 2. As a result, part of the spontaneous emission beam is output toward the mirror 5. Then the part of the spontaneous emission beam reflected by the mirror 5 is led as the reference light L via the mirrors 6 and 7 to the beam splitter 14. A portion of the reference light L is reflected by the beam splitter 14 and guided into the spectroscope 12.

Meanwhile, the narrowed oscillation line L0 output from the output mirror 4 is input to the beam splitter 13. Thereupon, part of the narrowed oscillation line L0 is reflected by the beam splitter 13 and input to the beam splitter 14. Part of the narrowed oscillation line L0 is transmitted through the beam splitter 14 and guided into the spectroscope 12.

Detection of the wavelength of the narrowed oscillation line L0 in the case where the spectroscope 12 is a diffraction-grating type is here described.

Figure 3:
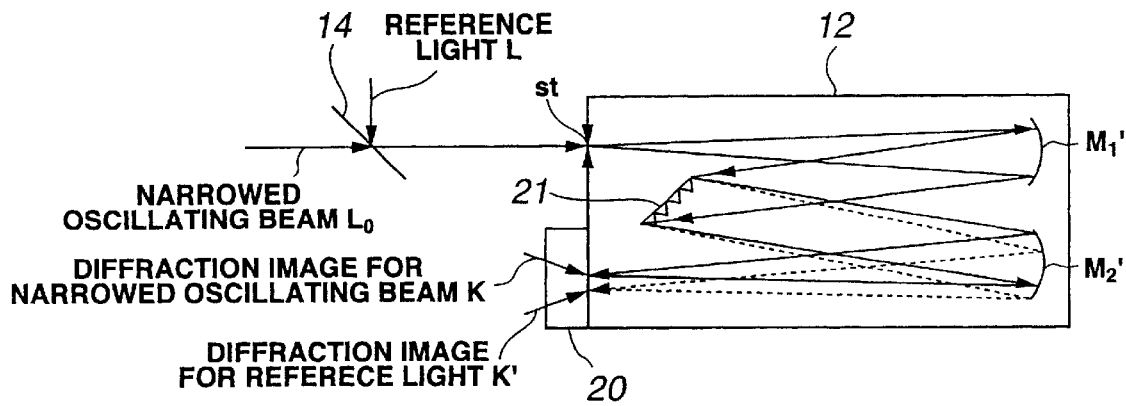
FIG. 3 is a diagram of a refraction grating type spectroscope.

FIG. 3 is a diagram of a diffraction-grating type spectroscope 12.

When the narrowed oscillation line L0 and the reference light L are input to the spectroscope 12, they are first input to the concave mirror M1, and the reflected light is input to a diffraction grating 21. The diffraction angle of the diffraction grating 21 varies according to the wavelength of the input light. The narrowed oscillation line L0 and reference light L diffracted by the diffraction grating 21 are input to a concave mirror M2 and the reflected light is led to the line sensor 20.

The line sensor 20 can be configured using one-dimensional or two-dimensional image sensors or, alternatively, using a diode array.

If the wavelength of the light input to the spectroscope 12 differs, the diffraction angle of the diffraction grating 21 will be different and the input position to the line sensor 20 will be different. As a consequence, a narrowed oscillation line L0 and reference light L having different wavelengths can be spectrally diffracted and input to the line sensor 20, diffracted images K and K for the narrowed oscillation line L0 and reference light L obtained according to the detection position on the line sensor 20, and the wavelengths $\lambda 0$ and $\lambda$, respectively, of the narrowed oscillation line L0 and reference light L input to the spectroscope 12 thereby detected. That is, the position of the diffraction image K on the line sensor 20 varies according to the wavelength of the light. When an etalon is used instead of the diffraction grating 21, the position of the fringe pattern on the line sensor 20 will vary.

The theory applied here in this embodiment aspect is now explained.

As diagrammed in FIG. 2, the wavelengths of the spontaneous emission beams L1 and L2 differ, respectively, wherefore the channel numbers on the line sensor 20 will also differ, respectively, as noted by S1 and S2 (positions on the line sensor).

The line sensor 20 is provided with a plurality of light reception channels, and the light detection position on the line sensor 20 is determined according to the number of the channel that detected the light of maximum intensity. In the, line sensor 20, the position of input to the line sensor 20 differs according to the wavelength, wherefore the wavelength of the light can be detected from the light detection position on the line sensor 20. Accordingly, the wavelength of the light is determined from the channel number where the light was detected.

Now, if a dispersion value D for the spectroscope 12 (that value D being a wavelength corresponding to the interval between channels in the line sensor 20) can be determined, then, using that dispersion value D, the difference between either the channel number S1 or S2 where the reference light (spontaneous emission beam) L1 or L2 was detected and the channel number S0 where the narrowed oscillation line L0 was detected can be converted to the relative wavelength of the narrowed oscillation line L0 relative to the reference light L1 or L2. Thereupon, the wavelength $\lambda 0$ of the narrowed oscillation line L0 can be computed from that derived relative wavelength and either the known wavelength $\lambda 1$ (=157.6299 nm) or $\lambda 2$ (=157.5233 nm) of the reference light L1 or L2.

The processing for computing the wavelength $\lambda 0$ of the narrowed oscillation line L0 performed by a wavelength controller 11 is now described.

Figure 4:
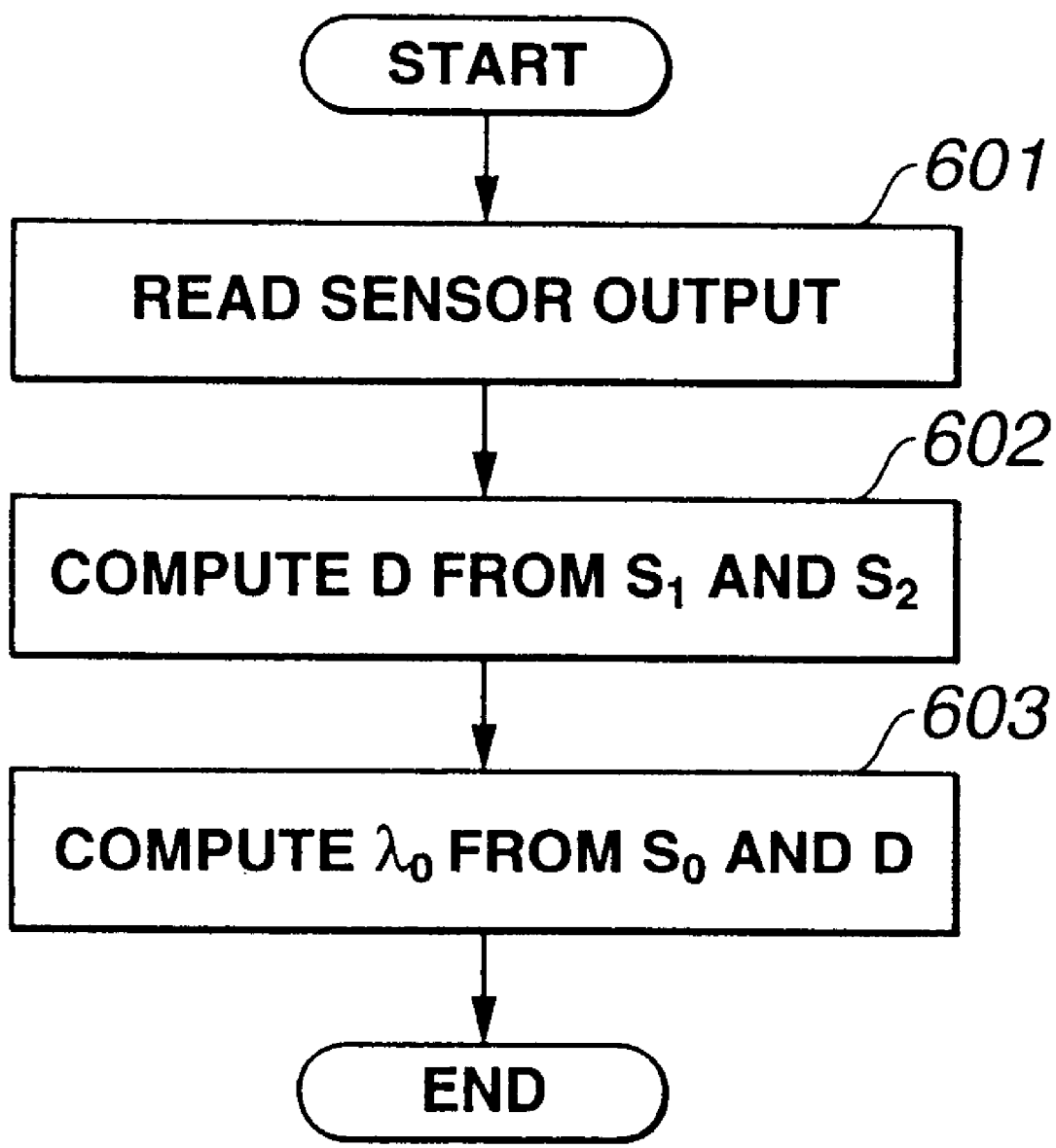
FIG. 4 is a flowchart of processing procedures for computing the wavelength of a narrowed oscillation line.

FIG. 4 is a flowchart for the processing performed by the wavelength controller 11 in computing the wavelength $\lambda 0$ of the narrowed oscillation line L0.

First, the output of the line sensor 20 is read out (step 601).

As diagrammed in FIG. 2, three sensor channel numbers S1, S0, and S2 corresponding to three signal sensor strength peaks are output from the line sensor 20. Here the wavelength $\lambda 1$ of the reference light L1 is $\lambda 1$ 157.6299 nm, and the wavelength $\lambda 2$ of the reference light L2 is $\lambda 2$ 157.5233 nm. Let it be assumed, meanwhile, as an example, that the wavelength $\lambda 0$ of the narrowed oscillation line L0 is smaller than $\lambda 1$ but larger than $\lambda 2$.

Accordingly, S0 will be made the channel number where the narrowed oscillation line L0 was detected, S0 being smaller than the channel number S1 where the reference light L1 was detected but larger than the channel number S2 where the reference light L2 was detected (step 601).

Next, the dispersion value D (wavelength per single channel in the line sensor 20) is computed, as in formula (1) given below, using the channel numbers S1 and S2 where the two reference lights L1 and L2 were detected and the known wavelengths $\lambda 1$ (=157.6299 nm) and $\lambda 2$ (=157.5233 nm) of the two reference lights L1 and L2.

$$D=(\lambda 1-\lambda 2)/(S1-S2) \quad (1)$$

Next, using the dispersion value D noted above, the wavelength $\lambda 0$ of the narrowed oscillation line L0 is found as indicated in formula (2) below.

$$\lambda 0=\lambda 2+(S0-S2)\cdot D \quad (2)$$

That is, by multiplying the dispersion value D by the difference between the channel number S0 where the narrowed oscillation line L0 was detected and the channel number S2 where the reference light L2 was detected to find the relative wavelength (S0–S2) of the narrowed oscillation line L0 relative to the reference light L2, that is, (S0–S2)·D, and adding the known wavelength $\lambda 2$ of the reference light L2 to that relative wavelength (S0–S2)·D, the wavelength $\lambda 0$ of the narrowed oscillation line L0 is computed. In the formula (2) given above, the wavelength $\lambda 2$ of the reference light L2 and the channel number S2 are used, but instead thereof the wavelength $\lambda 1$ of the reference light L1 and the channel number S1 may be used (step 603).

In this embodiment aspect, furthermore, the wavelength $\lambda 0$ of the narrowed oscillation line L0 is calculated using the channel corresponding to the peak of the light intensity I, but this calculation method poses no limitation, and it is permissible to find an approximate curve for improving the precision, and then to calculate the peak of the approximate curve so found to find the wavelength $\lambda 0$ of the narrowed oscillation line L0.

Figure 5:
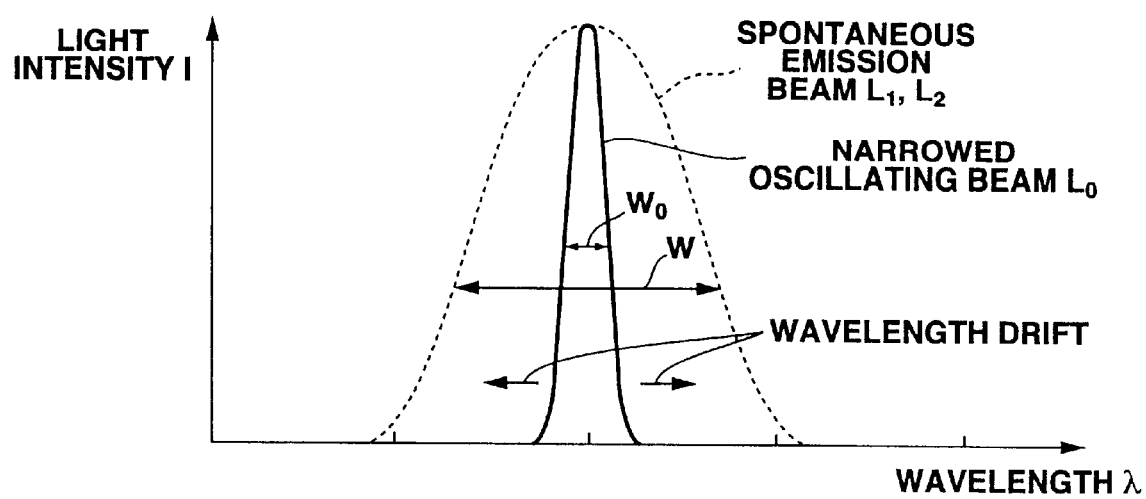
FIG. 5 is a diagram that compares the beam width of a spontaneous emission beam from a molecule fluorine laser that is the reference light with the beam width of a narrowed oscillation line.

FIG. 5 is a diagram that compares the beam width W of a spontaneous emission beam L1 or L2 from a molecule fluorine laser that is the reference light L with the beam width W0 of a narrowed oscillation line L0.

As diagrammed in FIG. 5, the width W of the spontaneous emission beams L1 and L2 of the molecule fluorine laser is roughly 2 pm, and the beam width W0 of the narrowed oscillation line L0 is line-narrowed to 2 pm or less relative to that width W of the spontaneous emission beams L1 and L2.

Here, the width W of the spontaneous emission beams L1 and L2 of the molecule fluorine laser indicated by the dashed line curve in FIG. 5 is narrow at 2 pm, and the peak of the light intensity I is evident.

Accordingly, as based on this embodiment aspect, even in cases where the center wavelength of the narrowed oscillation line L0 drifts and does not stabilize, an emission beam is detected wherewith the wavelength of the narrowed oscillation line L0 is approximated and the light intensity is at or above a certain level, and that is made the reference light L, wherefore the precision wherewith the wavelength of the narrowed oscillation line is detected can be improved without using a reference light source and without lowering the narrowed oscillation line output.

When the wavelength $\lambda 0$ of the narrowed oscillation line L0 exists between the wavelengths $\lambda 1$ and $\lambda 2$ of the two reference lights L1 and L2, as in the example described above, the wavelength $\lambda 0$ of the narrowed oscillation line L0 can be found precisely by interpolation, which is a benefit.

It is preferable, moreover, that the two reference lights L1 and L2 and narrowed oscillation line L0 described above be input simultaneously. That is because the characteristics of the spectroscope 12 that fluctuate according to the environment can then be measured in real time.

In the embodiment aspect described in the foregoing, a diffraction grating type spectroscope is employed, but a Fabry-Perot spectroscope may also be used.

Figure 6:
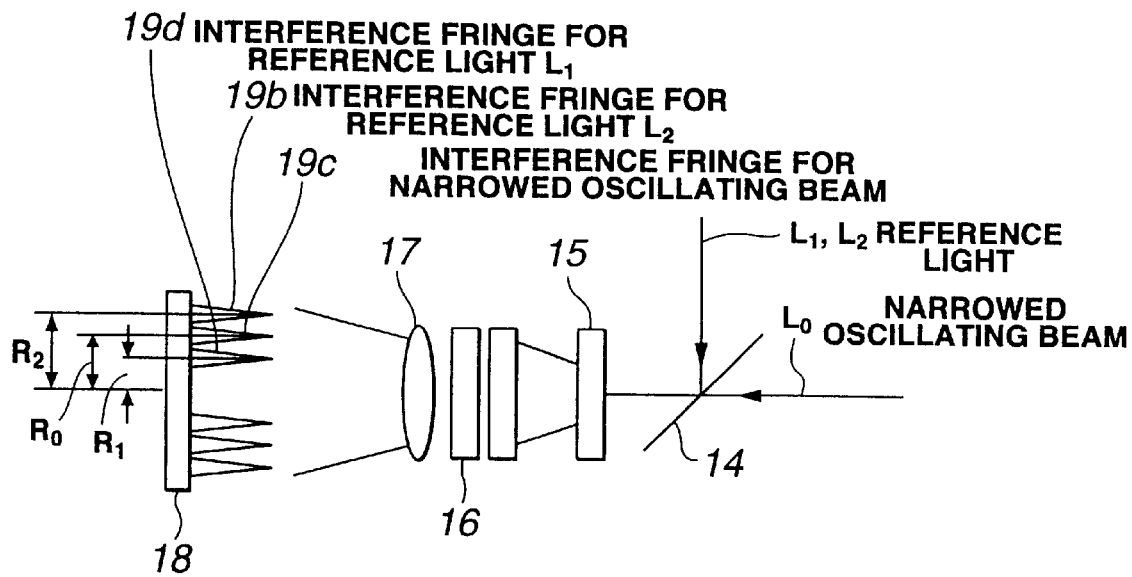
FIG. 6 is a diagram of an example configuration of a wavelength detection device wherein a Fabry-Perot etalon spectroscope is used.
Figure 7:
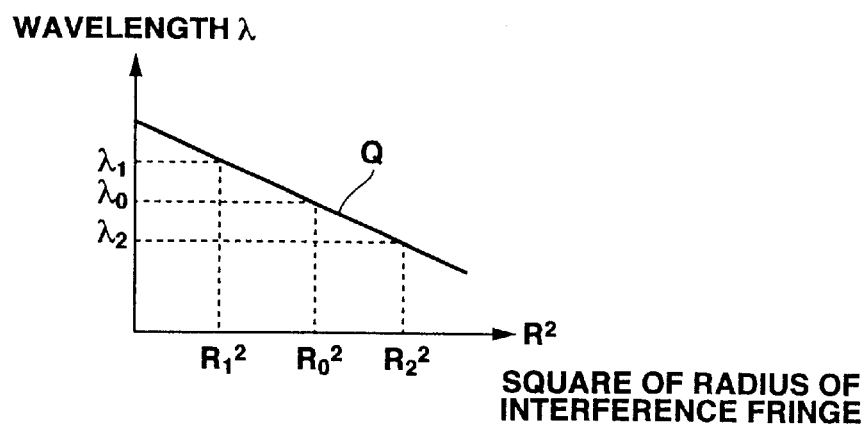
FIG. 7 is a diagram showing the relationship between the square of an interference fringe radius and wavelength.

FIG. 6 is a diagram of an example configuration of a wavelength detection device wherein a Fabry-Perot etalon spectroscope is used, and FIG. 7 is a diagram showing the relationship between the square of the interference fringe radius and wavelength.

Portions of the reference lights L1 and L2 led to the beam splitter 14 are reflected by the beam splitter 14 and irradiated onto a diffusion plate 15. Portions of the reference lights L1 and L2 irradiated are irradiated on the etalon 16 after being diffused by the diffusion plate 15. Meanwhile, some of the narrowed oscillation line L0 input to the beam splitter 14 is transmitted through the beam splitter 14 and irradiated onto the diffusion plate 15. From the diffusion plate 15, the narrowed oscillation line L0 is scattered and output so as to be irradiated onto the etalon 16.

The etalon 16 here is configured by two transmitting plates the inside faces whereof are made partially reflecting mirrors. This etalon 16 transmits the narrowed oscillation line L0 and the reference lights L1 and L2 having different wavelengths.

The light that is transmitted through the etalon 16 is input to a condensing lens 17. This condensing lens 17 is an achromatic lens corrected for chromatic aberration, for example, when chromatic aberration correction is needed for the wavelength difference between the narrowed oscillation line L0 and the reference lights L1 and L2. The chromatic aberration is corrected through the achromatic lens 17.

The line sensor 18 is deployed at the focal point of the condensing lens 17. Thus the light that passes through the condensing lens 17 is formed into an image on the line sensor 18, whereupon an interference fringe 19a corresponding to the wavelength $\lambda 1$ of the reference light L1, an interference fringe 19b corresponding to the wavelength $\lambda 2$ of the reference light L2, and an interference fringe 19c corresponding to the wavelength $\lambda 0$ of the narrowed oscillation line L0 are formed. These interference fringes are formed concentrically on the line sensor 18.

The radius of the interference fringe 19a corresponding to the reference light L1 (from the center position of the line sensor 18) is R1, the radius of the interference fringe 19b corresponding to the reference light L2 is R2, and the radius of the interference fringe 19c corresponding to the narrowed oscillation line L0 is R0.

In the line sensor 18, the radii R1, R2, and R0 from the line sensor center to the position where each interference fringe is formed as an image are detected.

Here, as diagrammed in FIG. 7, the relationship between the square R2 of a radius R from the line sensor center to the position where a interference fringe is formed as an image and the wavelength $\lambda$ of the light formed as an image on the line sensor 18 is theoretically linear.

That is, the relationship between the squares $R1^2$ and $R2^2$ of the radii of the interference fringes 19b and 19a of the reference lights L1 and L2, on the one hand, and the wavelengths $\lambda 1$ and $\lambda 2$, on the other, is expressed as a linear function, the coefficient whereof can be found. Specifically, the slope of the straight line Q is determined.

Accordingly, the position of image formation of the interference fringe 19c for the narrowed oscillation line L0, that is, the radius R0 of that interference fringe 19c, is now detected on the line sensor 18, whereby the square $R0^2$ of that radius can be found, and, from the straight line Q plotted in FIG. 7, the wavelength $\lambda 0$ corresponding to the square $R0^2$ of the radius can be found as the wavelength of the detected light L0.

Furthermore, in the embodiment aspect described in the foregoing, two reference lights L1 and L2 are used, but one or other of those reference lights L1 and L2 may be used instead.

In that case, however, the dispersion value D cannot be found, wherefore the precision wherewith the wavelength $\lambda 0$ of the narrowed oscillation line L0 is detected will deteriorate slightly.

Also, when detecting the wavelength of a narrowed oscillation line of a molecule fluorine laser as described in the foregoing, although provision is made for using one or both of the two reference lights L1 and L2, when detecting the wavelength of the narrowed oscillation line of an argon ion laser, since an argon ion laser produces two or more spontaneous emission beams, that spontaneous emission beam of the argon ion laser is used as the reference light wherewith the wavelength of the narrowed oscillation line of the argon ion laser is approximated and the light intensity is at or higher than a certain level.

Second Embodiment Aspect

In the embodiment aspect described in the foregoing, provision is made for guiding a spontaneous emission beam reflected by the prism 2 to the beam splitter 14, but provision may be made instead for taking spontaneous emission beams directly from the laser chamber 1 and leading them to the beam splitter 14.

Figure 8:
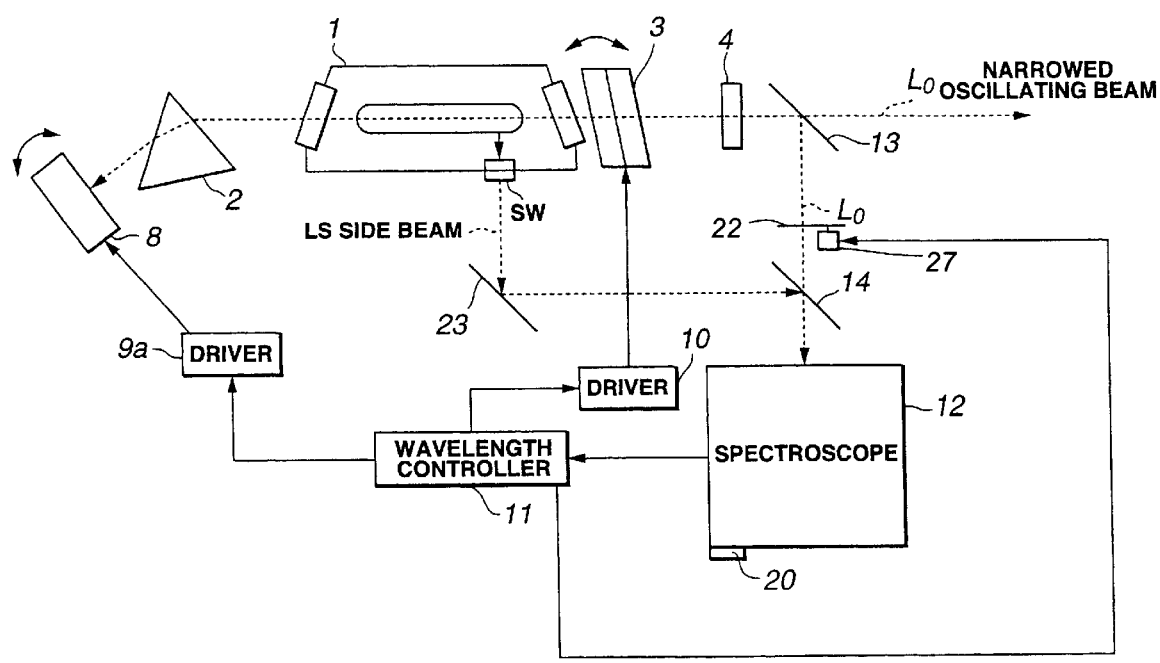
FIG. 8 is a diagram of the configuration of a wavelength detection device relating to a second embodiment aspect.

FIG. 8 is a diagram of an embodiment aspect wherein the spontaneous emission beam is taken directly from the laser chamber 1 and led to the beam splitter 14. In FIG. 8, the configuring elements that are identical to those in FIG. 1 and FIG. 18 described earlier are indicated by the same symbols and further description of those configuring elements is omitted herebelow as expedient.

In this embodiment aspect are comprised: a side window SW, deployed in the portion of the wall of the laser chamber 1 that, in a plane that is perpendicular to a plane containing the laser light axis and discharge direction of the laser chamber 1, intersects an axis extending in a direction removed from the laser light axis, for extracting spontaneous emission beams L1 and L2 discharge-excited inside the laser chamber 1 as side beam Ls; a mirror 23 for reflecting the side beam Ls and guiding it to the beam splitter 14; a shutter 22 for interrupting or passing the narrowed oscillation line L0 directed toward the beam splitter 14; and a solenoid 27 for operating the shutter 22 to open or close according to the output from a wavelength controller 11.

The detection of the wavelength of the narrowed oscillation line L0 performed in this embodiment aspect is now described with reference to FIG. 3, FIG. 8, and FIG. 9.

Figure 9:
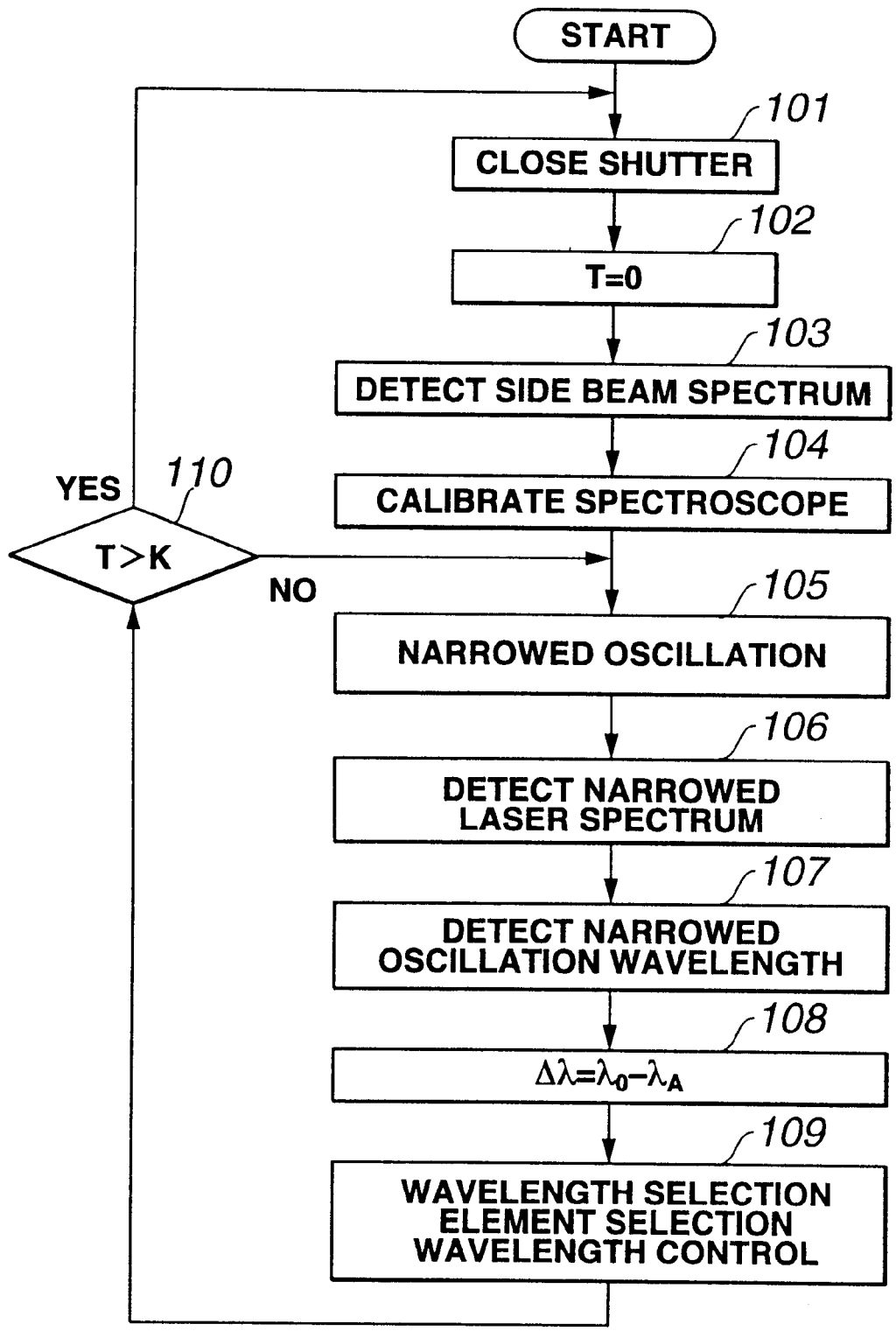
FIG. 9 is a flowchart of wavelength detection processing procedures performed by the wavelength detection device diagrammed in FIG. 8.

FIG. 9 is a processing flowchart for the detection of the wavelength of the narrowed oscillation line L0 performed by the wavelength controller 11.

First, the solenoid 27 is driven in response to an output from the wavelength controller 11, and thereby the shutter 22 is closed. The reason for doing this is that, because the light intensity of the side beam Ls is weak compared to that of the narrowed oscillation line L0, it is necessary to interrupt the narrowed oscillation line L0 with the shutter 22 in order to detect only the side beam Ls (step 101).

Here, an elapsed time T indicating the time elapsed in the wavelength detection processing is set to 0 seconds by a timer (not shown), and thereafter the elapsed time T is counted as the wavelength detection processing progresses (step 102).

A spontaneous emission beam discharge-excited in the laser chamber 1 is extracted as the side beam Ls from the side window SW, whereupon the extracted side beam Ls is output toward the mirror 23. Upon being reflected by the mirror 23, the side beam Ls is guided as the reference lights L1 and L2 to the beam splitter 14. Portions of the reference lights L1 and L2 are reflected by the beam splitter 14 and input to the spectroscope 12. The reference lights L1 and L2 input to the spectroscope 12 are guided to the line sensor 20. Thus the wavelengths $\lambda 1$ and $\lambda 2$ of the reference lights L1 and L2 are detected (step 103).

The wavelengths of the reference lights L1 and L2 detected by the line sensor 20 are the known wavelengths $\lambda 1=157.6299$ nm and $\lambda 2=157.5233$ nm. Therefore the center wavelength $\lambda 0$ of the narrowed oscillation line L0 input to the light receiving channels S1 and S2 on the line sensor 20 is corrected by the wavelengths $\lambda 1=157.6299$ nm and $\lambda 2=157.5233$ nm of the reference lights L1 and L2. Thus the light reception channels S1 and S2 on the line sensor 20 become evident. In this embodiment aspect, furthermore, wavelength correction is performed at regular periods, but such may also be performed when not making exposures. Such may also be performed when changing the laser gas in the laser chamber 1 (step 104).

The spontaneous emission beams L1 and L2 discharge-excited inside the laser chamber 1 are laser-oscillated through a prism 2 and etalon 3 inside a resonator configured with an output mirror 4 and a fully reflecting mirror 8. Thereupon the light wavelength-selected by the prism 2 and further line-narrowed and oscillated by the etalon 3 is output from the output mirror 4 as a narrowed oscillation line L0 of a prescribed power. The narrowed oscillation line L0 output from the output mirror 4 is input to the beam splitter 13 (step 105).

Next, the solenoid 27 is driven in response to an output from the wavelength controller 11 and the shutter 22 is opened. Thereby, a part of the narrowed oscillation line L0 reflected by the beam:splitter 13 is input to the beam splitter 14. The part of the narrowed oscillation line L0 so input is transmitted through the beam splitter 14 and led into the spectroscope 12.

Here, when the light intensity of the reference lights L1 and L2 resulting from the side beam Ls is stronger than that of the narrowed oscillation line L0, another shutter must be provided for interrupting that side beam Ls, and the side beam Ls must be interrupted. When detecting the side beam Ls, it is only necessary to open that shutter.

The narrowed oscillation line L0 input to the spectroscope 12 is led to the line sensor 20. Thus the narrowed oscillation line L0 is detected (step 106).

The difference in wavelength between the light receiving channels on the line sensor 20 is determined by the lens characteristics and the distance between the spectroscope 12 and the line sensor 20, and can be expressed as the constant $\delta$. Accordingly, the wavelength $\lambda 0$ of an unknown narrowed oscillation line L0 for which the light intensity is detected on the line sensor 20 can be found by either formula (3) or formula (4), given below, using the wavelengths $\lambda 1=157.6299$ nm and $\lambda 2=157.5233$ nm of the reference lights L1 and L2, the number of channels X1 and X2 between the light receiving channels S1 and S2, on the one hand, and the light receiving channel S0 where the wavelength $\lambda 0$ of the unknown narrowed oscillation line L0 is detected, on the other, and the constant $\delta$.

$$\lambda 01 = 157.6299 \pm X1 \times \delta \quad (3)$$

$$\lambda 02 = 157.5233 \pm X2 \times \delta \quad (4)$$

The wavelength $\lambda 0$ of the narrowed oscillation line L0 may also be found as the mean value between the two wavelengths $\lambda 01$ and $\lambda 02$ found from the formulas given above. Furthermore, because two or more reference lights are being used, the wavelength $\lambda 0$ of the narrowed oscillation line L0 may also be found using the dispersion value D of the spectroscope 12 as described earlier (step 107).

Next, the wavelength difference $\Delta\lambda$ between a target wavelength $\lambda A$ and the wavelength $\lambda 0$ of the narrowed oscillation line L0 found in step 107 is found (step 108).

The wavelength controller 11 drives the driver 10 (to adjust the installation angle of the etalon 3), based on the wavelength difference $\Delta\lambda$ found in step 108, and selects the wavelength of the light to be input to the etalon 3 (step 109).

Thereupon a comparison is made between the elapsed time T and a prescribed time K (5 minutes, for example) (step 110). If the elapsed time T exceeds the prescribed time K (decision YES in step 110), then the processing routine in step 101 described above is executed, and thereafter the processing routines of steps 101 to 109, described above, are executed again. If the elapsed time T is within the prescribed time K (decision NO in step 110), on the other hand, the processing routine in step 105, described above, is executed, and then the processing routines in steps 105 to 109 described above are executed again. The reason for this is that it is necessary to again subject the spectroscope 12 to wavelength correction when the wavelength detection processing time exceeds a prescribed time, but it is not necessary to subject the spectroscope 12 to wavelength correction again when the wavelength detection processing time is within the prescribed time.

As described in the foregoing, even in an embodiment aspect wherein spontaneous emission beams are taken directly from the laser chamber 1 and led to the beam splitter 14, an emission beam is detected wherewith the wavelength of the narrowed oscillation line L0 is approximated and the light intensity is equal to or higher than a prescribed level, and that emission beam is made the reference light L, wherefore the precision wherewith the wavelength of the narrowed oscillation line is detected can be improved without using a reference light source and without lowering the narrowed oscillation line output.

Third Embodiment Aspect

Now, when detecting the spontaneous emission beams L1 and L2, it is permissible to cause spontaneous oscillation for a prescribed period of time before performing line narrowing generation and then to perform the detection.

Figure 10:
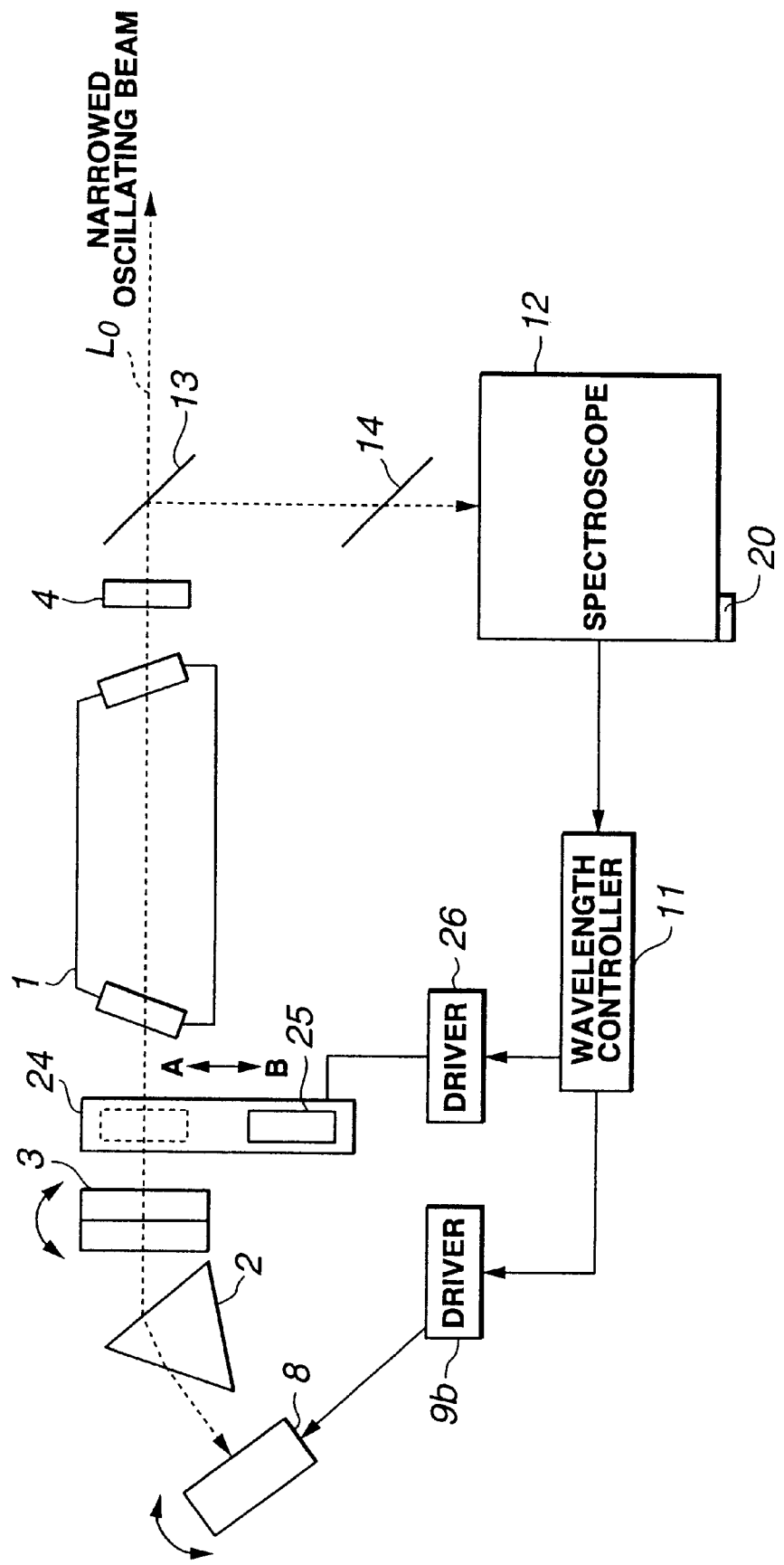
FIG. 10 a diagram of the configuration of a wavelength detection device relating to a third embodiment aspect.

FIG. 10 is a diagram of an embodiment aspect wherein provision is made so that, when detecting the spontaneous emission beams L1 and L2, the detection is performed after causing spontaneous oscillation for a prescribed time before effecting line narrowing generation. In FIG. 10, the configuring elements that are identical to those in FIG. 1, FIG. 8, and FIG. 18 described earlier are indicated by the same symbols and further description of those configuring elements is omitted herebelow as expedient.

In this embodiment aspect are comprised: a driver 9b for driving an etalon 3 and a fully reflecting mirror 8 (to adjust the installation angles thereof) in response to outputs from a wavelength controller 11; a mirror 25 that functions as a rear mirror for taking light output from the laser chamber 1 and reflecting it back again toward the laser chamber 1; an X stage 24, deployed between the laser chamber 1 and the etalon 3, comprising the mirror 25; and a driver 26 for driving the mirror 25 either to a position where the spontaneous emission beams L1 and L2 are reflected back toward the laser chamber 1 or to a position where those beams L1 and L2 are guided to the etalon 3, according to the output from a wavelength controller 11.

Next, the detection of the wavelength of the narrowed oscillation line L0 performed in this embodiment aspect is described with reference to FIG. 2, FIG. 10, and FIG. 11.

Figure 11:
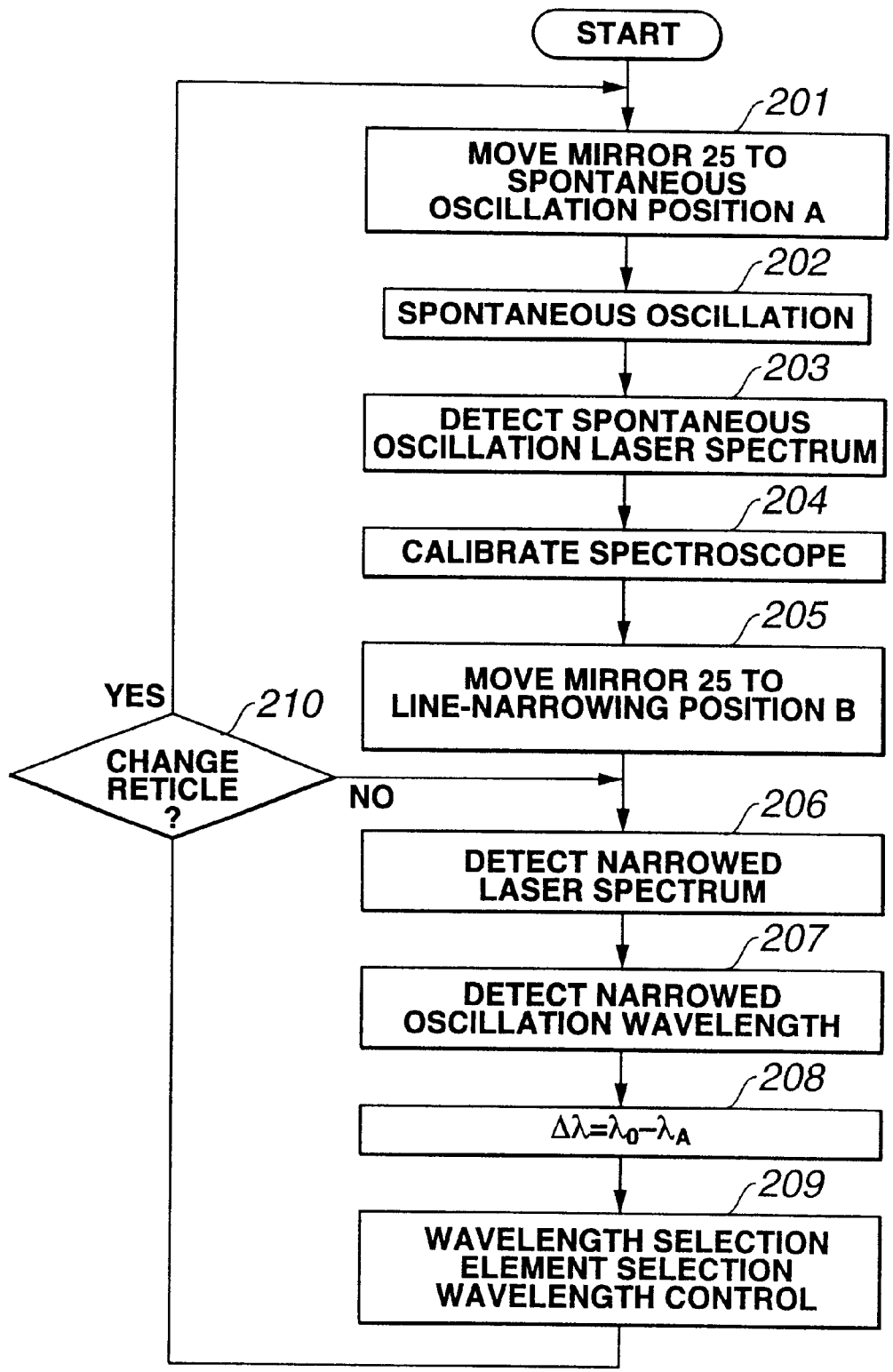
FIG. 11 is a flowchart of wavelength detection processing procedures performed by the wavelength detection device diagrammed in FIG. 10.

FIG. 11 is a flowchart of the processing performed by the wavelength controller 11 to detect the wavelength of the narrowed oscillation line L0.

First, the driver 26 is driven in response to an output from the wavelength controller 11, whereby the mirror 25 provided in the X stage 24 is moved to a position (spontaneous oscillation position) A whereat the spontaneous emission beams L1 and L2 output from the laser chamber 1 are reflected back again toward the laser chamber 1 (step 201).

By the mirror 25 being moved to the position A in step 201, the spontaneous emission beams L1 and L2 output from the laser chamber 1 are reflected toward the laser chamber 1, and oscillate in a resonator configured by the mirror 25 and the output mirror 4. Thus the spontaneous emission beams L1 and L2 can be made to spontaneously oscillate without being line-narrowed (step 202).

The spontaneous emission beams L1 and L2 are output from the output mirror 4 as reference lights L1 and L2 of prescribed power. The reference lights L1 and L2 output from the output mirror 4 are input to the beam splitter 13. Portions of the reference lights L1 and L2 so input are reflected by the beam splitter 13 and led to the beam splitter 14. Portions of the reference lights L1 and L2 are reflected by the beam splitter 14 and input to the spectroscope 12. The reference lights L1 and L2 input to the spectroscope 12 are guided to the line sensor 20. Thus the wavelengths $\lambda 1$ and $\lambda 2$ of the reference lights L1 and L2 are detected (step 203).

Next, the center wavelength λ0 of the narrowed oscillation line L0 input to the light receiving channels S1 and S2 on the line sensor 20 is corrected, as in the processing routine in step 104 described earlier. In this embodiment aspect, moreover, wavelength correction may be performed periodically, or when not making exposures, as when changing reticles or the semiconductor wafers that are the subjects of the exposures, or prior to making exposures (step 204).

When the wavelength correction has been completed, next the driver 26 is driven in response to an output from the wavelength controller 11, and the mirror 25 is moved to a position (line narrowing position) B whereat the spontaneous emission beams L1 and L2 output from the laser chamber 1 are guided to the etalon 3. The spontaneous emission beams L1 and L2 output from the laser chamber 1 are thereby input to the etalon 3 (step 205).

The spontaneous emission beams L1 and L2 input to the etalon 3 pass through the prism 2 and are reflected again by the fully reflecting mirror 8. Thus the beams L1 and L2 are wavelength-selected by the prism 2 and line-narrowed by the etalon 3. Thereupon the beams L1 and L2 oscillate inside the resonator configured by the output mirror 4 and the fully reflecting mirror 8. The line-narrowed spontaneous emission beams L1 and L2 are output from the output mirror 4 as a narrowed oscillation line L0 of a prescribed power. The narrowed oscillation line L0 output from the output mirror 4 is input to the beam splitter 13. Thereupon, a part of the narrowed oscillation line L0 reflected by the beam splitter 13 is input to the beam splitter 14. The part of the narrowed oscillation line L0 so input is transmitted through the beam splitter 14 and guided into the spectroscope 12. The narrowed oscillation line L0 input to the spectroscope 12 is guided to the line sensor 20. Thus the narrowed oscillation line L0 is detected (step 206).

Next, the wavelength λ0 of the unknown narrowed oscillation line L0 detected on the line sensor 20 is found, as in the processing routine in step 107 described earlier (step 207).

Next, the wavelength difference Δλ between a target wavelength λA and the wavelength λ0 of the narrowed oscillation line L0 is found, as in the processing routine in step 108 described earlier (step 208).

Next, the wavelength controller 11 drives the driver 9b (to adjust the installation angle of the etalon 3), based on the wavelength difference Δλ found in step 208, and selects the wavelength of the light to be input to the etalon 3, as in the processing routine in step 109 described earlier (step 209).

Then, when changing the reticle for the exposure object, for example (decision YES in step 210), the processing routine in step 201 described above is moved to, and thereafter the processing routines in steps 202 to 209 described above are again executed. When not changing the reticle, on the other hand (decision NO in step 210), the processing routine in step 206 described above is moved to, and thereafter the processing routines in steps 206 to 209 are again executed.

When detecting the spontaneous emission beams L1 and L2, as described in the foregoing, even in an embodiment aspect wherein provision is made so that detecting is done after causing spontaneous oscillation for a prescribed period of time before effecting line narrowing oscillation, an emission beam is detected wherewith the narrowed oscillation line L0 wavelength is approximated, and the light intensity is at or above a certain level, and that emission beam is made the reference light L, wherefore the precision wherewith the wavelength of the narrowed oscillation line is detected can be improved without using a reference light source and without lowering the narrowed oscillation line output.

Fourth Embodiment Aspect

In the embodiment aspect described in the foregoing, spontaneous emission beams L1 and L2 are switched from spontaneous oscillation so that line narrowing will be effected according to the position of a mirror 25, but the spontaneous emission beams L1 and L2 may also be switched from spontaneous oscillation so that line narrowing will be effected according to the opening and closing of a light interrupting plate.

Figure 12:
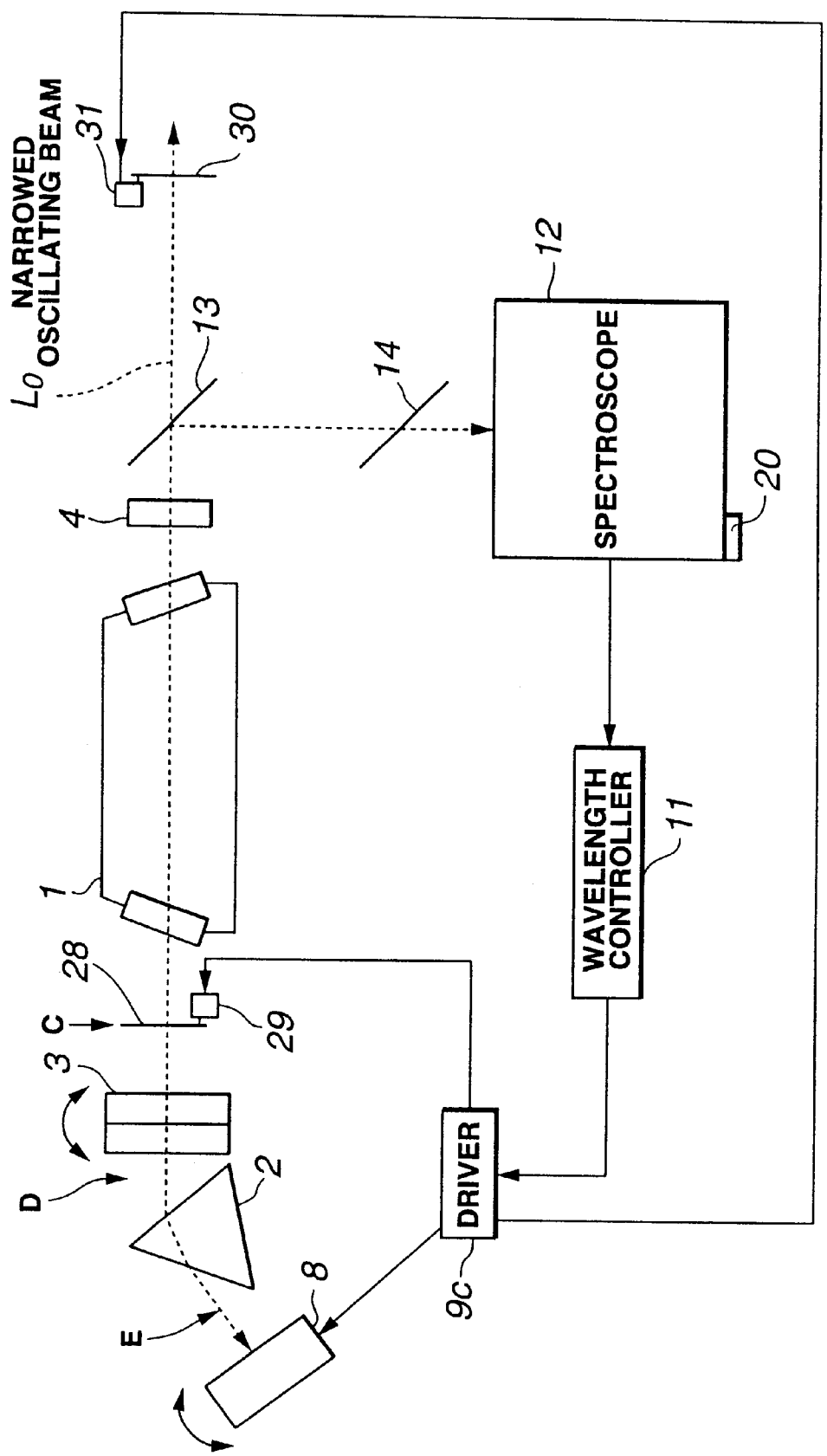
FIG. 12 a diagram of the configuration of a wavelength detection device relating to a fourth embodiment aspect.

FIG. 12 is a diagram representing an embodiment aspect wherein spontaneous emission beams L1 and L2 are switched from spontaneous oscillation so that line narrowing will be effected in response to the opening and closing of a light interrupting plate. In FIG. 12, the configuring elements that are identical to those in FIG. 1, FIG. 8, FIG. 10, and FIG. 18 described earlier are indicated by the same symbols and further description of those configuring elements is omitted herebelow as expedient.

In this embodiment aspect are comprised a light interrupting plate 28 for interrupting or passing spontaneous emission beams L1 and L2 directed toward an etalon 3; a solenoid 29 for operating the light interrupting plate 28 to open or close in response to outputs from a wavelength controller 11; a shutter 30 for interrupting or passing a narrowed oscillation line L0 directed toward an exposure surface; a solenoid 31 for operating the shutter 30 so as to open or close in response to outputs from the wavelength controller 11; and a driver 9c for driving the etalon 3 and a fully reflecting mirror 8 (to adjust the installation angles thereof) in response to outputs from the wavelength controller 11 and also for driving the solenoids 29 and 31.

Next, the detection of the wavelength of the narrowed oscillation line L0 performed in this embodiment aspect is described with reference to FIG. 2, FIG. 12, and FIG. 13.

Figure 13:
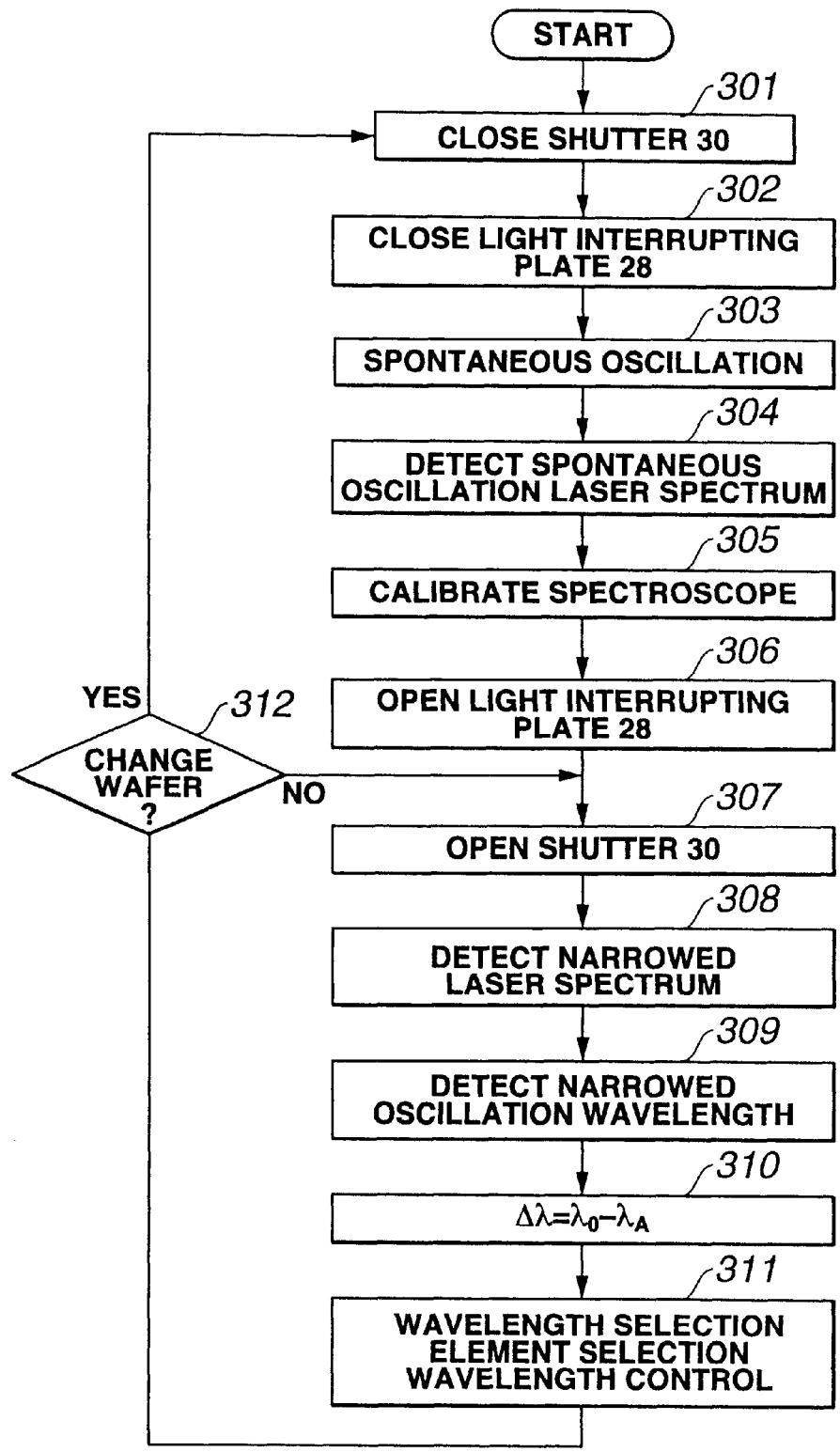
FIG. 13. is a flowchart of wavelength detection processing procedures performed by the wavelength detection device diagrammed in FIG. 12.

FIG. 13 is a flowchart of processing routines performed by the wavelength controller 11 to detect the wavelength of the narrowed oscillation line L0.

First, the solenoid 31 is driven in response to an output from the wavelength controller 11, and thereby the shutter 30 is closed (step 301).

Next, the solenoid 29 is driven in response to an output from the wavelength controller 11, and thereby the light interrupting plate 28 is closed (step 302).

By the shutter 30 and light interrupting plate 28 being closed, the spontaneous emission beams L1 and L2 output one time only from the laser chamber 1 toward the output mirror 4 are output as the reference lights L1 and L2 of prescribed power from the output mirror 4. Thus the spontaneous emission beams L1 and L2 can be prevented from being line-narrowed (step 303).

Next, the wavelengths λ1 and λ2 of the spontaneous emission beams L1 and L2 acting as reference lights are detected on the line sensor 20, as in the processing routine in step 203 described earlier (step 304).

Next, the center wavelength λ0 of the narrowed oscillation line L0 input to the light receiving channels S1 and S2 on the line sensor 20 are corrected, as in the processing routines in steps 104 and 204 described earlier. Furthermore, although in this embodiment aspect the wavelength is corrected periodically, that may be done when not making exposures, as when changing the reticle or the semiconductor wafers that are the subjects of the exposures, or prior to making exposures (step 305).

Next, the solenoid 29 is driven in response to an output from the wavelength controller 11, and the light interrupting plate 28 is opened. Thereby, the spontaneous emission beams L1 and L2 output from the laser chamber 1 are input to the etalon 3 (step 306).

Next, the solenoid 31 is driven in response to an output from the wavelength controller 11, and the shutter 30 is opened. Thereby, a part of the narrowed oscillation line L0 of prescribed power output from the output mirror 4 is transmitted through the beam splitter 13 and output onto the exposure surface (step 307).

Next, the narrowed oscillation line L0 is detected on the line sensor 20, as in the processing routine in step 206 described earlier (step 308).

Next, the wavelength $\lambda 0$ of the unknown narrowed oscillation line L0 detected on the line sensor 20 is found as in the processing routine in steps 107 and 207 described earlier (step 309).

Next, the wavelength difference $\Delta\lambda$ between a target wavelength $\lambda A$ and the wavelength $\lambda 0$ of the narrowed oscillation line L0 is found as in the processing routines in steps 108 and 208 described earlier (step 310).

Next, the wavelength controller 11 drives the driver 9c (to adjust the installation angle of the etalon 3), based on the wavelength difference $\Delta\lambda$ found in step 310, as in the processing routines in steps 109 and 208 described earlier, and selects the wavelength of the light to be input to the etalon 3 (step 311)

Thereupon, when changing the semiconductor wafer that is the exposure subject, for example (decision YES in step 312), the processing routine of step 301 described above is moved to, and thereafter the processing routines in steps 301 to 311 described above are again executed. When not changing the semiconductor wafer (decision NO in step 312), on the other hand, the processing routine in step 307 described above is moved to, and thereafter the processing routines in steps 307 to 311 are again executed.

As described in the foregoing, even in an embodiment aspect that switches the spontaneous emission beams L1 and L2 from spontaneous oscillation so that line narrowing is effected according to whether a light interrupting plate is open or closed, an emission beam is detected wherewith the wavelength of the narrowed oscillation line L0 is approximated, and the light intensity is at or above a certain level, and that emission beam is made the reference light L, wherefore the precision with which the wavelength of a narrowed oscillation line is detected can be improved without using a reference light source and without lowering the narrowed oscillation line output.

In this embodiment aspect, furthermore, provision is made for deploying the light interrupting plate 28 at a position C between the laser chamber 1 and the etalon 3, but it may instead be deployed either at a position D between the prism 2 and the etalon 3, or at a position E between the fully reflecting mirror 8 and the prism 2.

Fifth Embodiment Aspect

In the embodiment aspect described in the foregoing, a mirror 25 or light interrupting plate 28 is used to switch the spontaneous emission beams L1 and L2 from spontaneous oscillation so that line narrowing will be effected, but the spontaneous emission beams L1 and L2 may be switched from spontaneous oscillation to line narrowing by changing the installation angle of the etalon 3.

Figure 14:
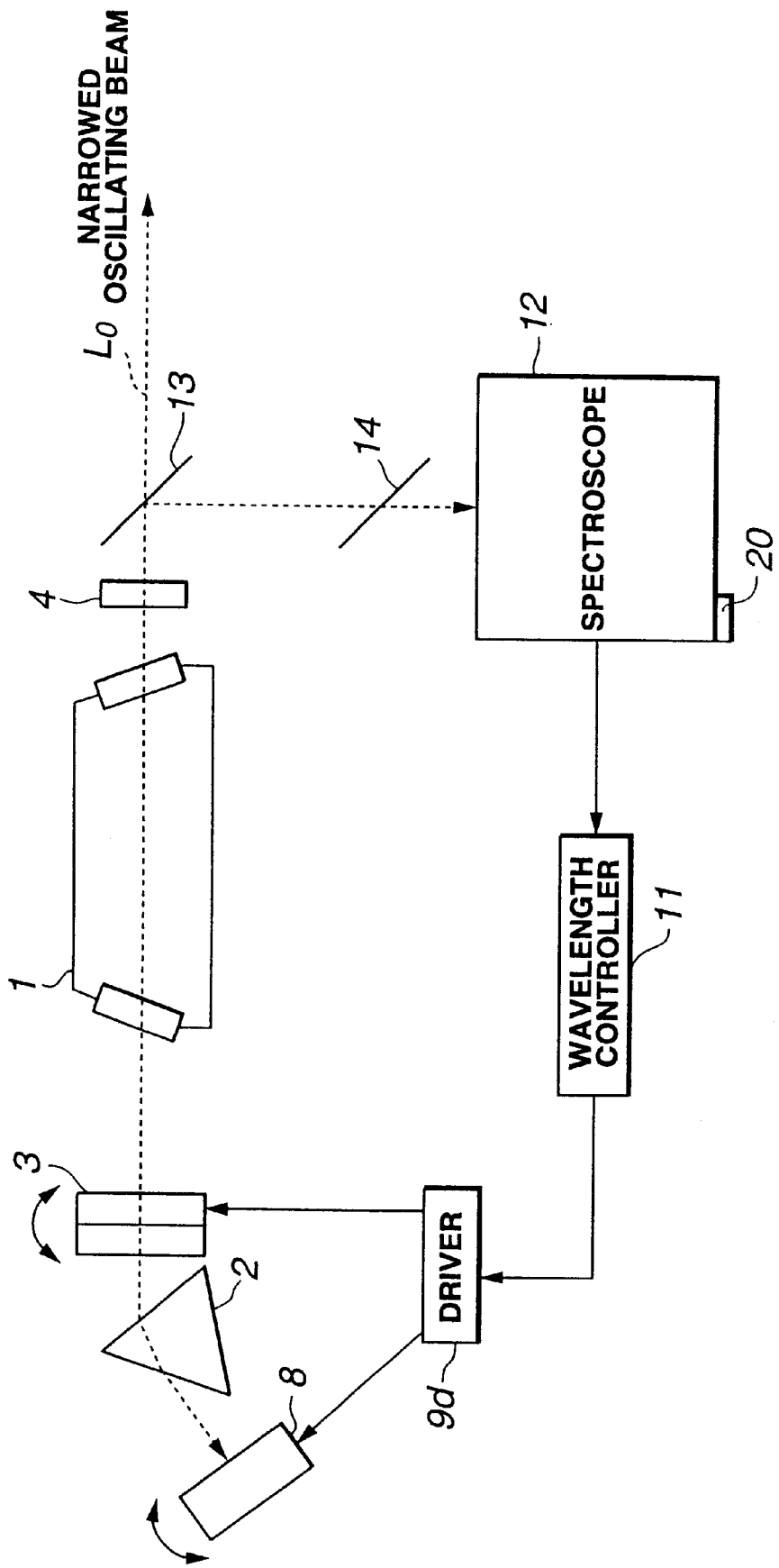
FIG. 14 a diagram of the configuration of a wavelength detection device relating to a fifth embodiment aspect.

FIG. 14 is a diagram representing an embodiment aspect that switches the spontaneous emission beams L1 and L2 from spontaneous oscillation to line narrowing by changing the installation angle of the etalon 3. In FIG. 14, the configuring elements that are identical to those in FIG. 1, FIG. 8, FIG. 10, FIG. 12, and FIG. 18 described earlier are indicated by the same symbols and further description of those configuring elements is omitted herebelow as expedient.

In this embodiment aspect is comprised a driver 9b for driving the etalon 3 and the fully reflective mirror 8 (to adjust the installation angles thereof) in response to outputs from the wavelength controller 11.

Next, the detection of the wavelength of the narrowed oscillation line L0 performed in this embodiment aspect is described with reference to FIG. 2, FIG. 14, and FIG. 15.

Figure 15:
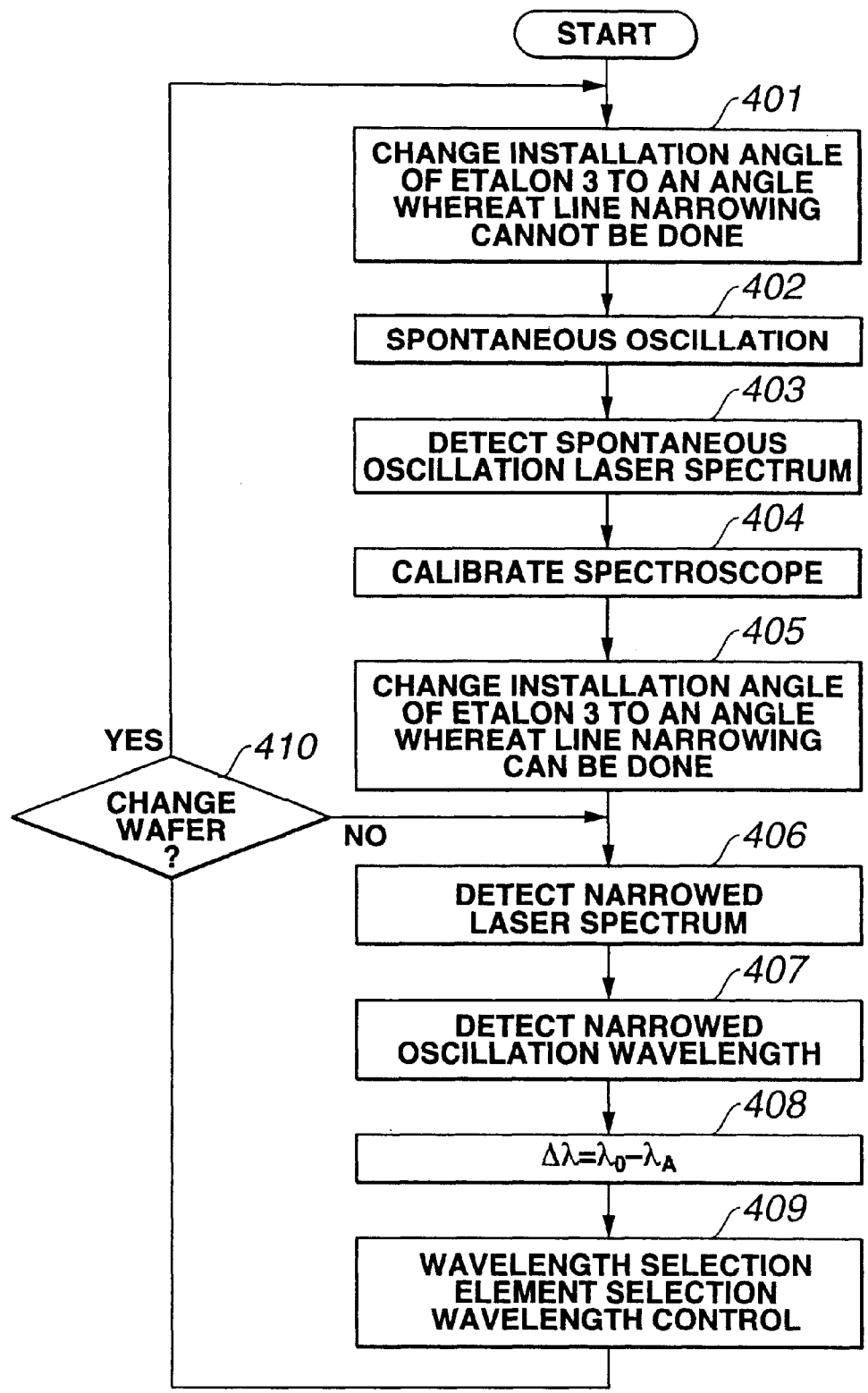
FIG. 15 is a flowchart of wavelength detection processing procedures performed by the wavelength detection device diagrammed in FIG. 14.

FIG. 15 is a flowchart of the processing routines performed by the wavelength controller 11 to detect the wavelength of the narrowed oscillation line L0.

First, the etalon 3 is driven through the driver 9b in response to an output from the wavelength controller 11, and the installation angle of the etalon 3 is changed to an installation angle whereat the spontaneous emission beams L1 and L2 cannot be line-narrowed (step 401).

By the installation angle of the etalon 3 being changed to an installation angle whereat the spontaneous emission beams L1 and L2 cannot be line-narrowed, in step 401, the etalon 3 functions as a rear mirror. That is, when the center axis of the etalon 3 becomes perpendicular to the axis extending in the direction wherein the spontaneous emission beams L1 and L2 are radiated out, the etalon 3 will function as a rear mirror. Thereby, the spontaneous emission beams L1 and L2 input to the etalon 3 are reflected toward the laser chamber 1, and oscillate inside a resonator configured by the etalon 3 and the, output mirror 4. Thus the spontaneous emission beams L1 and L2 can be made to spontaneously oscillate without being line-narrowed (step 402).

Next, the wavelengths $\lambda 1$ and $\lambda 2$ of the spontaneous emission beams L1 and L2 acting as reference lights are detected on the line sensor 20 as in the processing routines in steps 203 and 304 described earlier (step 403).

Next, the center wavelength $\lambda 0$ of the narrowed oscillation line L0 input to the light receiving channels S1 and S2 on the line sensor 20 is corrected, as in the processing routines in steps 104, 204, and 305 described earlier. Furthermore, although in this embodiment aspect the wavelength is corrected periodically, that may be done when not making exposures, as when changing the reticle or the semiconductor wafers that are the subjects of the exposures, or prior to making exposures (step 404).

When the wavelength correction has been completed, next the etalon 3 is driven through the driver 9b in response to an output from the wavelength controller 11, and the installation angle of the etalon 3 is changed to an installation angle whereat the spontaneous emission beams L1 and L2 are line-narrowed. Thereby, the spontaneous emission beams L1 and L2 output from the laser chamber 1 pass through the etalon 3 (step 405).

Next, the narrowed oscillation line L0 is detected as in the processing routines in steps 106, 206, and 308 described earlier (step 406).

Next, the wavelength $\lambda 0$ of the unknown narrowed oscillation line L0 detected on the line sensor 20 is found as in the processing routines in steps 107, 207, and 309 described earlier (step 407).

Next, the wavelength difference $\Delta\lambda$ between a target wavelength $\lambda A$ and the wavelength $\lambda 0$ of the narrowed oscillation line L0 is found as in the processing routines in steps 108, 208, and 310 described earlier (step 408).

Next, as in the processing routines in steps 109, 209, and 311 described earlier, the wavelength controller 11 drives the driver 9b (to adjust the installation angle of the etalon 3) on the basis of the wavelength difference Δλ found in step 408, and selects the wavelength of the light to be input to the etalon 3 (step 409).

Thereupon, when the semiconductor wafer that is the exposure subject is being changed, for example (decision YES in step 410), the processing routine in step 401 described above is moved to, and thereafter the processing routines in steps 401 to 409 described above are executed. When the semiconductor wafer is not being changed, however (decision NO in step 410), the processing routine in step 406 described above is moved to and thereafter the processing routines in steps 406 to 409 described above are executed.

Even in an embodiment aspect that switches the spontaneous emission beams L1 and L2 from spontaneous oscillation in order to effect line narrowing by changing the installation angle of the etalon 3 as described in the foregoing, an emission beam is detected wherewith the wavelength of the narrowed oscillation line L0 is approximated, and the light in tensity is at or above a certain level, and that emission beam is made the reference light L, wherefore the precision with which the wavelength of a narrowed oscillation line is detected can be improved without using a reference light source and without lowering the narrowed oscillation line output.

Sixth Embodiment Aspect

In the embodiment aspect described above, the spontaneous emission beams L1 and L2 are switched from spontaneous oscillation so that line narrowing can be effected by changing the installation angle of the etalon 3, but the spontaneous emission beams L1 and L2 can be switched from spontaneous oscillation so that they are line-narrowed by changing the installation angles of the output mirror 4 and the fully reflecting mirror 8.

Figure 16:
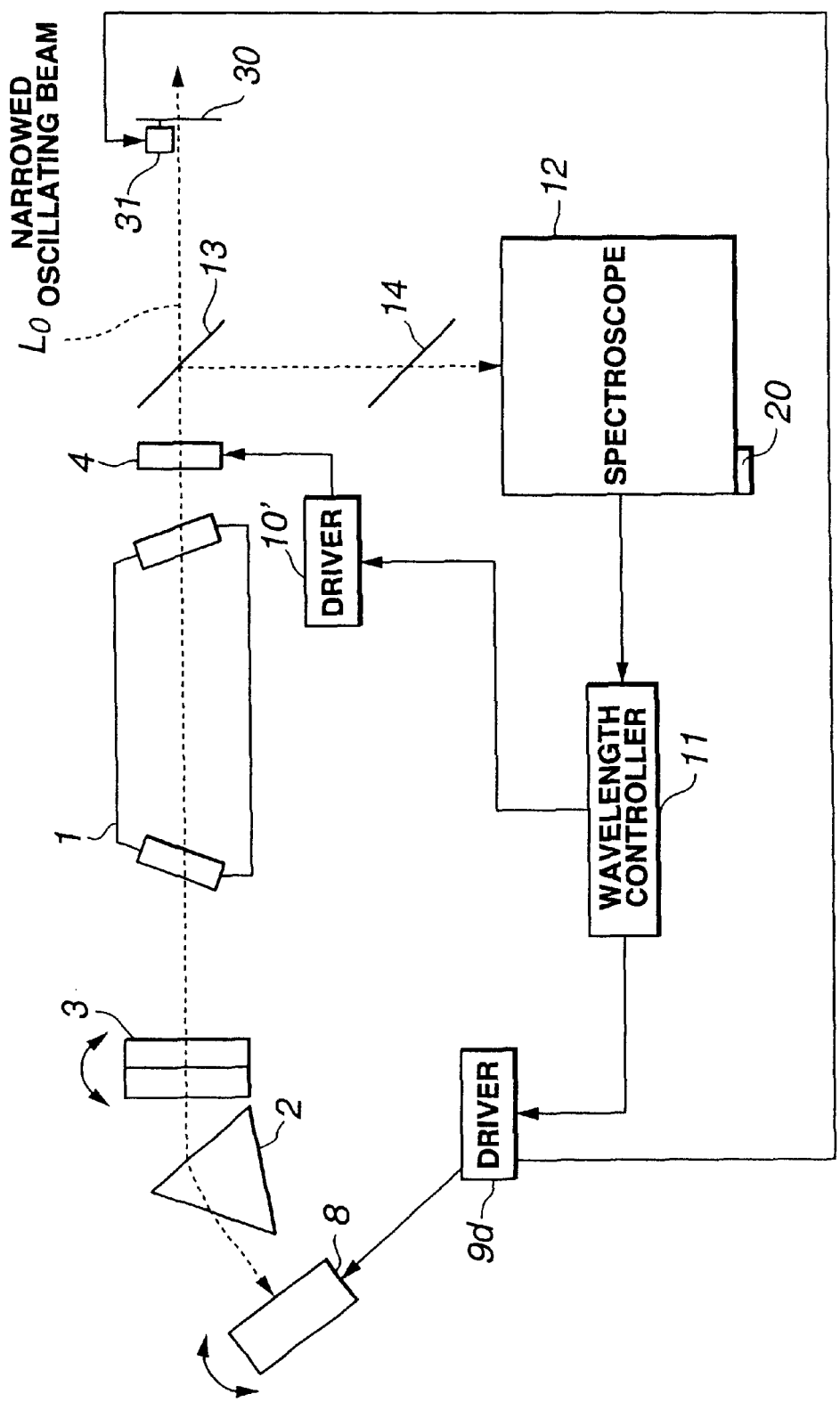
FIG. 16 a diagram of the configuration of a wavelength detection device relating to a sixth embodiment aspect.

FIG. 16 is a diagram representing an embodiment aspect that switches spontaneous emission beams L1 and L2 from spontaneous oscillation so as to effect line narrowing by changing the installation angles of the output mirror 4 and the fully reflecting mirror 8. In FIG. 16, the configuring elements that are identical to those in FIG. 1, FIG. 8, FIG. 10, FIG. 12, FIG. 14, and FIG. 18 described earlier are indicated by the same symbols and further description of those configuring elements is omitted herebelow as expedient.

In this embodiment aspect are comprised: a shutter 30 for interrupting or passing a narrowed oscillation line L0 directed toward an exposure surface; a solenoid 31 for operating the shutter 30 to open or close in response to outputs from a wavelength controller 11; a driver 9d for driving an output mirror 4 and a fully reflecting mirror 8 (to adjust the installation angles thereof) and for driving the solenoid 31; and a driver 10' for driving the output mirror 4 (to adjust the installation angle thereof) in response to outputs from the wavelength controller 11.

Figure 17:
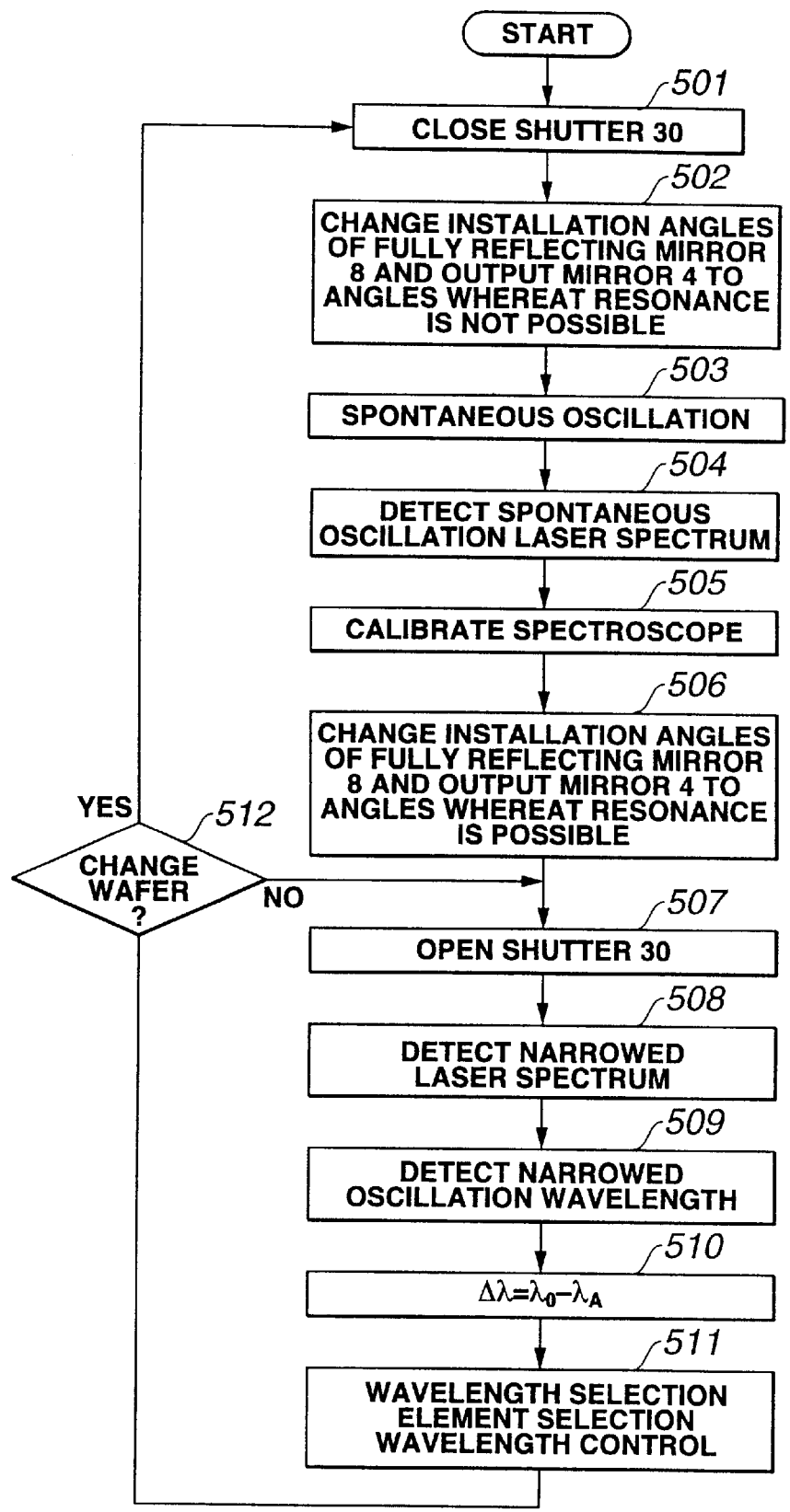
FIG. 17 is a flowchart of wavelength detection processing procedures performed by the wavelength detection device diagrammed in FIG. 16.

Next, the detection of the wavelength of the narrowed oscillation line L0 performed in this embodiment aspect is described with reference to FIG. 2, FIG. 16, and FIG. 17:

FIG. 17 is a flowchart of the processing routines performed by the wavelength controller 11 to detect the wavelength of the narrowed oscillation line L0.

First, the solenoid 31 is driven in response to an output from the wavelength controller 11, and the shutter 30 is thereby closed (step 501).

Next, the output mirror 4 is driven through the driver 10' in response to an output from the wavelength controller 11, the fully reflecting mirror 8 is driven through the driver 9d, and the installation angles of the output mirror 4 and fully reflecting mirror 8 are changed to installation angles whereat the functions of a resonator are not effected (step 502).

By the installation angles of the output mirror 4 and the fully reflecting mirror 8 being changed in step 502 to installation angles whereat the functions of a resonator are not effected, the spontaneous emission beams L1 and L2 can be extracted (step 503).

Next, the wavelengths λ1 and λ2 of the spontaneous emission beams L1 and L2 acting as reference lights are detected on the line sensor 20, as in the processing routines in steps 203, 304, and 403 described earlier (step 504).

Next, as in the processing routines in steps 104, 204, 305, and 404, described earlier, the center wavelength λ0 of the narrowed oscillation line L0 input to the light receiving channels S1 and S2 on the line sensor 20 is corrected. Furthermore, although in this embodiment aspect the wavelength is corrected periodically, that may be done when not making exposures, as when changing the reticle or the semiconductor wafers that are the subjects of the exposures, or prior to making exposures (step 505).

When the wavelength correction has been completed, the output mirror 4 is driven through the driver 10' in response to an output from the wavelength controller 11, the fully reflecting mirror 8 is driven through the driver 9b, and the installation angles of the output mirror 4 and the fully reflecting mirror 8 are changed to installation angles whereat the functions of a resonator are effected. Thereby, the spontaneous emission beams L1 and L2 output from the laser chamber 1 pass through the etalon 3 and are line-narrowed (step 506).

Next, the solenoid 31 is driven in response to an output from the wavelength controller 11 and the shutter 30 is opened. Thereby, a portion of the narrowed oscillation line L0 of prescribed power output from the output mirror 4 is transmitted through the beam splitter 13 and output to the exposure surface (step 507).

Next, the narrowed oscillation line L0 is detected as in the processing routines in steps, 106, 206, 308, and 406, described earlier (step 508).

Next, the wavelength λ0 of the unknown narrowed oscillation line L0 output on the line sensor 20 is found as in the processing routines in steps 107, 207, 309, and 407, described earlier (step 509).

Next, the wavelength difference Δλ between a target wavelength λA and the wavelength λ0 of the narrowed oscillation line L0 is found as in the processing routines in steps 108, 208, 310, and 408, described earlier (step 510).

Next, as in the processing routines in steps 109, 209, 311, and 409, described earlier, the wavelength controller 11 drives the driver 9b based on the wavelength difference Δλ found in step 510 (to adjust the installation angle of the etalon 3), and selects the wavelength of the light to be input to the etalon 3 (step 511).

Thereupon, when the semiconductor wafer that is the exposure subject is being changed, for example (decision YES in step 512), the processing routine in step 501 described above is moved to, and thereafter the processing routines in steps 501 to 511 described above are executed.

When the semiconductor wafer is not being changed, however (decision NO in step 512), the processing routine in step 507 described above is moved to and thereafter the processing routines in steps 507 to 511 described above are executed.

Even in an embodiment aspect that switches the spontaneous emission beams L1 and L2 from spontaneous oscillation in order to effect line narrowing by changing the installation angles of the output mirror 4 and the fully reflecting mirror 8 as described in the foregoing, an emission beam is detected wherewith the wavelength of the narrowed oscillation line L0 is approximated, and the light intensity is at or above a certain level, and that emission beam is made the reference light L, wherefore the precision with which the wavelength of a narrowed oscillation line is detected can be improved without using a reference light source and without lowering the narrowed oscillation line output.

Seventh Embodiment Aspect

Figure 18:
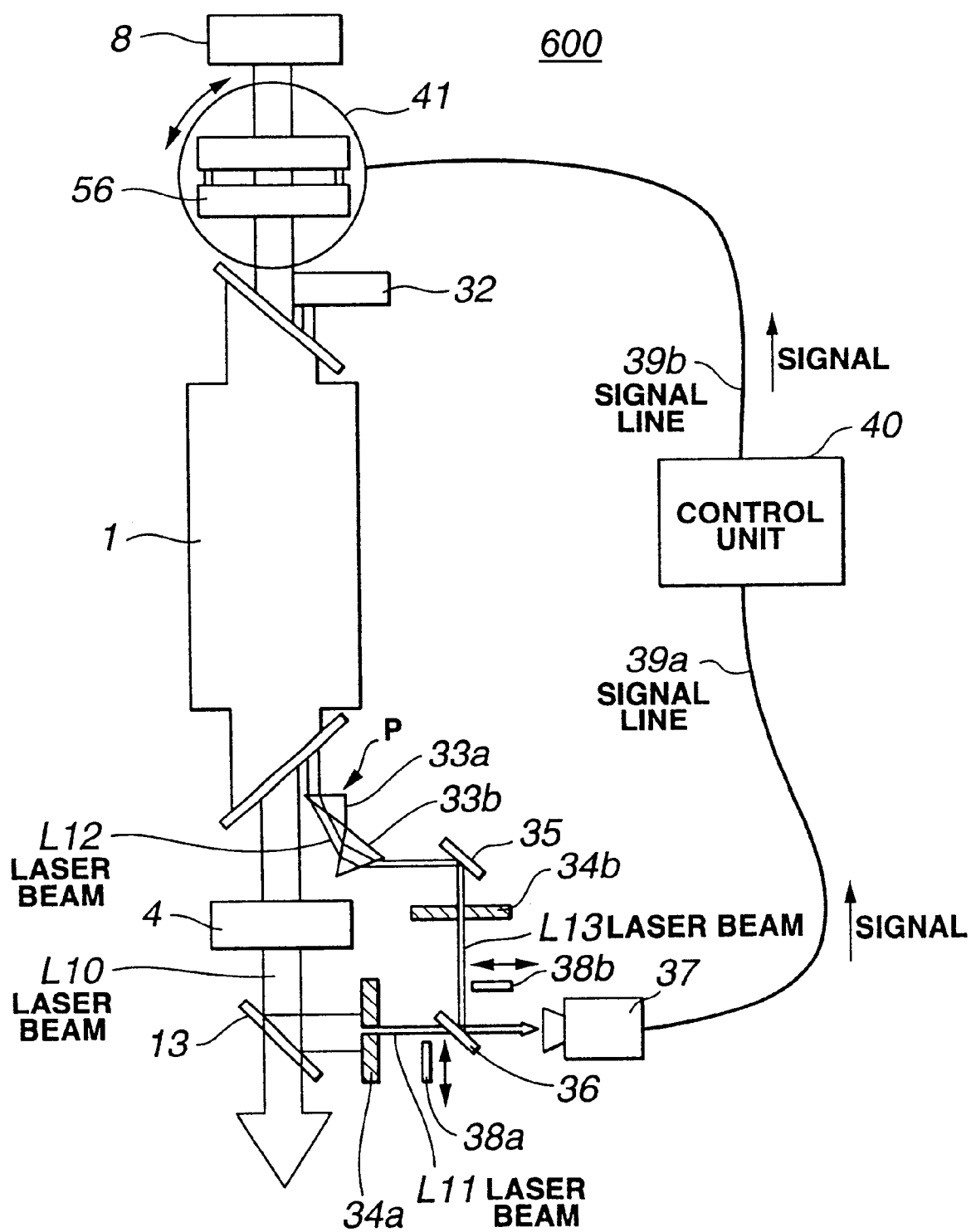
FIG. 18 is a configuration diagram representing the configuration of an ultra line-narrowed fluorine laser apparatus 600 relating to a seventh embodiment aspect.

FIG. 18 is a configuration diagram representing an ultra line-narrowed fluorine laser apparatus 600 relating to this seventh embodiment aspect.

As diagrammed in FIG. 18; in the ultra line-narrowed fluorine laser apparatus 600, a first resonator is configured by a fully reflecting mirror 8 and an output mirror 4, and a second resonator is configured by a fully reflecting mirror 32 and the front surface P of a prism 33a.

The first resonator is a stabilized type. A laser chamber 1 is deployed within this first resonator (hereinafter called the stabilized resonator).

In this stabilized resonator, an etalon 56 is deployed as a line narrowing element between the fully reflecting mirror 8 and the laser chamber 1. Oscillation lines are further line-narrowed (that is, ultra-line-narrowed) by this etalon 56.

In the etalon 56, centered on a strong line having a wavelength $\lambda 1 = 157.6299$ nm, the maximum transmittance wavelengths thereof are matched, wherefore, when laser oscillation is induced, a laser beam L10 that is ultra line-narrowed to a wavelength width of approximately 0.2 pm at the wavelength $\lambda 1 = 157.6299$ is extracted from the output mirror 4.

A beam splitter 13 having a reflectance of several percent or so reflects the input laser beam L10 in accordance with that reflectance, and transmits the rest of the laser beam.

A pinhole 34a, configured of an opaque member wherein is formed a hole of a prescribed diameter, guides that portion of an input laser beam which passes through the hole to a beam synthesizer 36.

Meanwhile, for reflecting on the output side in the second resonator noted above, surface reflection in the front surface P of the prism 33a is utilized. For that reason, the prism 33a is deployed so that the laser beam is input with an input angle relative to the front surface P (reflecting face) of the surface-reflected prism 33a that is perpendicular (90 degrees).

That is, because the second resonator is a stabilized type, and no line narrowing element is contained in this second resonator, the two lines (line of wavelength $\lambda 1 = 157.6299$ nm and line of wavelength $\lambda 2 = 157.5233$ nm) of the fluorine laser are oscillated as they are.

The prism 33a is a device that wavelength-disperses the laser beam L12 containing the two oscillation lines that are not line-narrowed. The prism 33b further wavelength-disperses the laser beam output from the second resonator, that is, the laser beam L12 output from the prism 33a.

In other words, in the laser beam L12 containing the two lines, a minute angular difference arises in the respective directions of advance of those two lines due to wavelength dispersion while that laser beam L12 is traveling between the two prisms 33a and 33b.

A pinhole 34b, configured by an opaque member wherein is formed a hole of a prescribed diameter, guides that portion of the input laser beam that passes through that hole to the beam synthesizer 36. Here, setting is made so that, by passing through the two prisms 33a and 33b, only that laser beam is passed which has, of the two oscillation lines advancing with an angular difference, the one oscillation line of wavelength $\lambda 1 = 157.6299$ nm.

The beam synthesizer 36 synthesizes the laser beam L11 (wavelength $\lambda 1 = 157.6299$ nm) from the pinhole 34a, which is line-narrowed, and the laser beam L13 (wavelength $\lambda 1$ 157.6299 nm) from the pinhole 34b, which is not line-narrowed, and outputs the resulting synthesized beam to the spectroscope 37.

The spectroscope 37, which is configured by a scanning Fabry-Perot etalon (not shown) and a piezo element (not shown) for changing the gap interval in that etalon, inputs both the laser beam L11 that is ultra-line-narrowed and the laser beam L13 that is single-line-implemented but not ultra-line-narrowed, and detects the spectrums of those laser beams, respectively.

In this spectroscope 37, by changing the gap interval in the scanning Fabry-Perot etalon with the piezo element, the spectrums of the input laser beams are detected.

More specifically, the gap interval in the scanning Fabry-Perot etalon changes proportionately with the applied voltage that is applied to the piezo element, wherefore the transmitting wavelengths of that etalon are scanned according to the changed gap interval. Accordingly, the transmitting wavelength of that etalon will vary in correspondence with the applied voltage to the piezo element.

A shutter 38a, made movable in the perpendicular direction, is used to interrupt or pass the laser beam L11 from the pinhole 34a.

A shutter 38b, made movable in the horizontal direction, is used to interrupt or pass the laser beam L13 from the pinhole 34b.

By controlling these two shutters 38a and 38b, one or other of the laser beams L11 or L13, or, alternatively, the laser beam synthesized by the beam synthesizer 36, is input to the spectroscope 37.

The control unit 40 controls the turning of the turning stage 41 to which the etalon 56 is secured, through a signal line 39b, based on a signal indicating the detection results from the spectroscope 37 input via a signal line 39a.

When this turning stage 41 turns, the etalon 56 secured to that turning stage 41 also turns accordingly, wherefore the input angle wherewith the laser beam is input to the etalon 56 will also change.

Next, the operations of the ultra line-narrowed fluorine laser apparatus 600 configured thusly is described with reference to FIG. 18.

Let it now be assumed! that, currently, both the shutter 38a and the shutter 38b are set so that input laser beams are passed to the beam synthesizer 36.

First, a laser beam laser-oscillated from the laser chamber 1 passes through the etalon 56, strikes the fully reflecting mirror 8 where it is fully reflected then again passes through the etalon 56, returns to and passes through the laser chamber 1, and is input to the output mirror 4. Thereby the laser beam is made to resonate and changed to a single line between the fully reflecting mirror 8 and the output mirror 4, and is further line-narrowed (that is, ultra-line-narrowed) by the etalon 56.

In the etalon 56, centered on a strong line having a wavelength $\lambda 1=157.6299$ nm, the maximum transmittance wavelengths thereof are matched, wherefore, when laser oscillation is induced, a laser beam L10 that is ultra line-narrowed to a wavelength width of approximately 0.2 pm at the wavelength $\lambda 1=157.6299$ is extracted from the output mirror 4.

This laser beam L10 strikes the beam splitter 13, laser light is reflected according to a reflectance of several percent or so, and that reflected laser light strikes the pinhole 34a.

The laser beam L11 that passes through the hole formed in the pinhole 34a and is ultra-line-narrowed is input to the beam synthesizer 36.

The portion of the laser beam L10 that passes through the beam splitter. 13, and which will be used in making an exposure, advances to the, main body of a fluorine exposure tool (not shown).

However, the laser beam oscillated from the laser chamber 1 also strikes the fully reflecting mirror 32 where it is fully reflected, returns to and passes through the laser chamber 1, and is input onto the front surface P (reflecting face) of the prism 33a.

In the second resonator, which is configured by the fully reflecting mirror 32 and the front surface P (reflecting face) of the prism 33a, the two lines of the fluorine laser are made to oscillate as they are.

The laser beam L12 that passes through the prism 33a, is extracted, and is made to oscillate by the second resonator, passes through the prism 33b, is reflected to the mirror 35, passes through the hole formed in the pinhole 34b, and then is input to the beam synthesizer 36.

However, in the laser beam L12 that contains the two lines output from the second resonator described above, a minute angular difference will develop between the directions of advance of the two lines, respectively, due to wavelength dispersion, as that the laser beam L12 advances between the two prisms 33a and 33b.

Here, setting is made so that, of the laser beams containing two lines reflected by the mirror 35, that laser beam L13 which has the one line (the line of wavelength $\lambda 1=157.6299$ nm) passes through the pinhole 34b. Therefore, to the spectroscope 37, both the laser beam L11 which is ultra-line-narrowed and the laser beam L13 which is implemented in a single line but not ultra-line-narrowed will be input.

Here, in the spectroscope 37, in cases where only the spectrum of the laser beam L13 that is not ultra-line-narrowed is measured, the shutter 38a is moved upward, in FIG. 18, and the laser beam L11 is interrupted, whereas, in cases where only the spectrum of the laser beam L11 that has been ultra-line-narrowed is measured, the shutter 38b is moved to the left, in FIG. 18, and the laser beam L13 is interrupted.

The spectroscope 37, by the two shutters 38a and 38b having their movements controlled, measures the spectrums, respectively, of the laser beam L11 and the laser beam L13, and sends the results of those measurements over the signal line 39a to the control unit 40.

The control unit 40, based on the measurement results from the spectroscope 37, controls the turning of the turning stage 41, via the signal line 39b, so as to cause the center wavelength in the wide spectrum of the laser beam L13 that is not ultra-line-narrowed and the center wavelength in the spectrum of the laser beam L11 that has been ultra-line-narrowed to coincide, in order to stabilize the center wavelength in the spectrum of the laser beam L11 that has been ultra-line-narrowed.

Next, the stabilization of the wavelength of the ultra-line-narrowed laser beam L10 is described with reference to FIGS. 19(a) and 19(b).

Figure 19A:
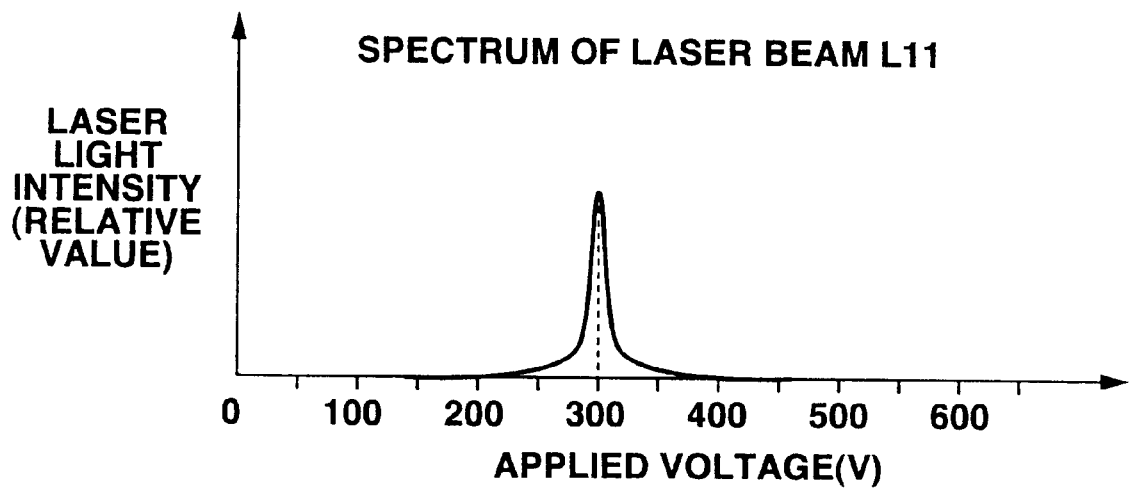
FIGS. 19(*a*) and 19(*b*) are diagrams for describing the spectrum of laser light in the ultra line-narrowed fluorine laser apparatus 600.
Figure 19B:
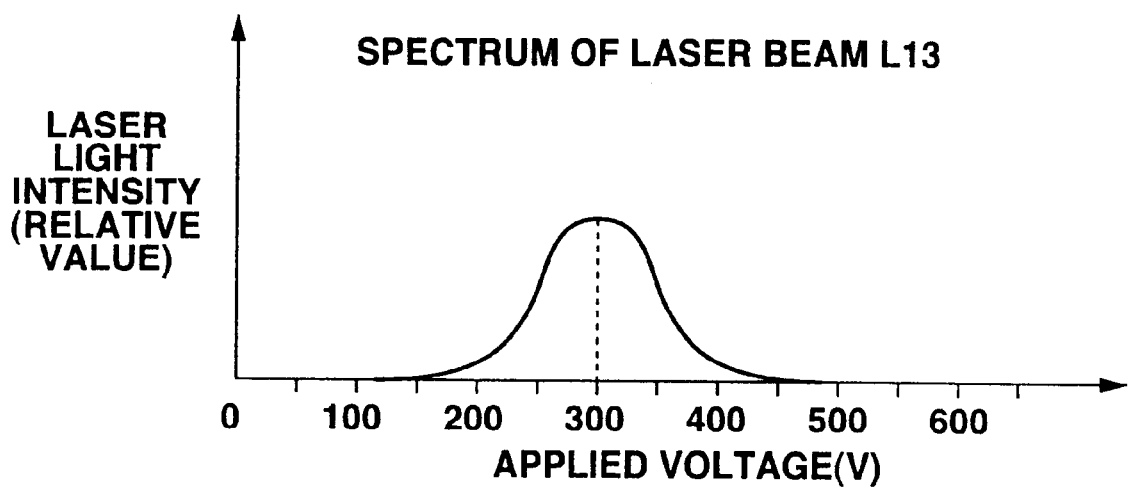

In the spectroscope 37, when only the spectrum of the laser beam L11 of wavelength $\lambda 1=157.6299$ nm is measured, in the condition wherewith the laser beam L13 is interrupted by the shutter 38b, a spectrum distribution of narrow wavelength width (the characteristic of a wavelength width that has been ultra-line-narrowed) is measured as shown in FIG. 19(a), whereas, on the other hand, when only the spectrum of the laser beam L13 of wavelength $\lambda 1=157.6299$ nm is measured, the spectrum distribution of wide wavelength width (characteristic of a wavelength width that has not been ultra-line-narrowed) diagrammed in FIG. 19(b) is measured.

In this embodiment aspect, the spectroscope 37, by changing the gap interval in the scanning Fabry-Perot etalon (not shown) by the piezo element (not shown), can detect these spectrums and obtain a spectrum distribution.

More specifically, the gap interval in the scanning Fabry-Perot etalon changes proportionately with the applied voltage to the piezo element, and the transmitting wavelengths of the scanning Fabry-Perot etalon also change with the changes in those gap intervals, wherefore, by scanning those changed transmitting wavelengths, the spectrum distribution can be obtained.

Accordingly, in view of the fact that the transmitting wavelength of the scanning Fabry-Perot etalon varies in correspondence with the voltage applied to the piezo element, the graphs given in FIGS. 19(a) and 19(b) are obtained.

In the spectrum distributions for the laser beams L11 and L12 plotted in FIGS. 19(a) and 19(b), at the point where the voltage applied to the piezo element is 300 V, for example, the center wavelength in the spectrum of the laser beam L13 that is not ultra-line-narrowed and the center wavelength in the spectrum of the laser beam L11 that has been ultra-line-narrowed coincide, which means that the center wavelength in the spectrum of the laser beam L10 that has been ultra-line-narrowed is stabilized.

Here the center wavelength in the spectrum of the laser beam L13 is absolutely unchangeable, irrespective of the angle set (deployment angle) for the etalon 56. That is, when the voltage applied to the piezo element is 300 V, a wavelength in the spectrum of the laser beam L13 becomes the center wavelength.

In contrast therewith, the center wavelength in the spectrum of the laser beam L11 will shift to the left and right from the point where the voltage applied to the piezo element is 300 V, according to the angle set (deployment angle) for the etalon 56.

Here, hypothetically, in a case where, when the voltage applied to the piezo element is 300 V, a wavelength in the spectrum of the laser beam L11 is not the center wavelength and the center wavelengths in the spectrums of the laser beam L11 and the laser beam L13 do not coincide, the setting angle may be adjusted in the following manner.

That is, the control unit 40, based on these spectrum characteristics when the voltage applied to the piezo element is 300 V, detects the gap (wavelength difference) between the center wavelength in the spectrum of the laser beam L11 (wavelength λ1=157.6299 nm) that is ultra-line-narrowed, as plotted in FIG. 19(a) and the center wavelength in the spectrum of the laser beam L13 (wavelength λ1=157.6299 nm) that is not ultra line-narrowed, as plotted in FIG. 19(b), and, based on the results of that detection, controls the turning of the turning stage 4, through the signal line 39b, so that the center wavelength in the spectrum of the laser beam L11 is positioned at the point where the voltage applied to the piezo element is 300 V.

The etalon 56 also turns in conjunction with the turning of this turning stage 41, wherefore the setting angle for the etalon 56 is finely adjusted, as a consequence whereof, the center wavelength for the ultra-line-narrowed laser beam L11 (that is, the laser beam L10) is controlled so that it is positioned at the center wavelength (absolute wavelength) in the spectrum of the laser beam L13 that is not ultra-line-narrowed.

Thus, by making the wavelength difference between the center wavelengths in the spectrums of these two laser beams zero, or effecting control so that they fall within a certain range, the center wavelength in the spectrum of the ultra-line-narrowed laser beam L10 can be stabilized.

In this embodiment aspect, moreover, a scanning Fabry-Perot etalon is used specifically for the spectroscope 37 for effecting wavelength stabilization. This is because of the characteristic of being able to make the spectroscope more compact than when a diffraction grating is used therein, making it ideal for incorporation into the interior of a laser apparatus.

More specifically, in a spectroscope wherein a diffraction grating is used, in devices having a resolution power of 1 pm or below, the light path length becomes long at approximately 1 meter or more, making the overall apparatus large when this is incorporated inside the laser apparatus.

In contrast therewith, in a spectroscope wherein a scanning Fabry-Perot etalon is used, when the FSR (also called the free spectrum range) that is the wavelength difference between the selected wavelengths is 1 pm, the gap interval will become 1 cm or thereabouts, wherefore the overall scanning Fabry-Perot etalon can be made compact at several tens of cm.

More specifically, by modifying the mathematical formula $FSR=\lambda^2/2 \cdot n \cdot d$ (pm), and computing the mathematical formula $d=\lambda^2/(2 \cdot n \cdot FSR)$, $d \approx 12.3$ mm is obtained.

It should be noted that, in the expressions above, λ represents wavelength (157 nm here), n represents the refractive index of the medium (here the refractive index in air≈1), and FSR represents the wavelength difference between the selected wavelengths (here being 1 pm).

Based on this embodiment aspect, as described in the foregoing, a laser beam that is not ultra-line-narrowed is oscillated simultaneously, the center wavelength in the wide spectrum of that laser beam is detected, and control is effected so that the center wavelength (that is, the absolutely wavelength) in the spectrum of that detected laser beam which is not ultra-line-narrowed and the center wavelength in the spectrum of the ultra-line-narrowed laser beam coincide, wherefore the center wavelength in the spectrum of the ultra-line-narrowed laser beam can be definitely stabilized.

Based on this embodiment aspect, furthermore, both the ultra-line-narrowed laser beam and the non-ultra-line-narrowed laser beam are input to the same spectroscope and the spectrums thereof measured, wherefore it becomes easy to readily effect the stabilization of the wavelength of an ultra-line-narrowed laser beam without using a reference light source.

Based on this embodiment aspect; moreover, a scanning Fabry-Perot etalon is used for the spectroscope 37 for effecting wavelength stabilization, wherefore the spectroscope can be made more compact than can a spectroscope wherein a diffraction grating is used, so that the laser apparatus in which this spectroscope is incorporated can also be made compact.

Eighth Embodiment Aspect

Figure 20:
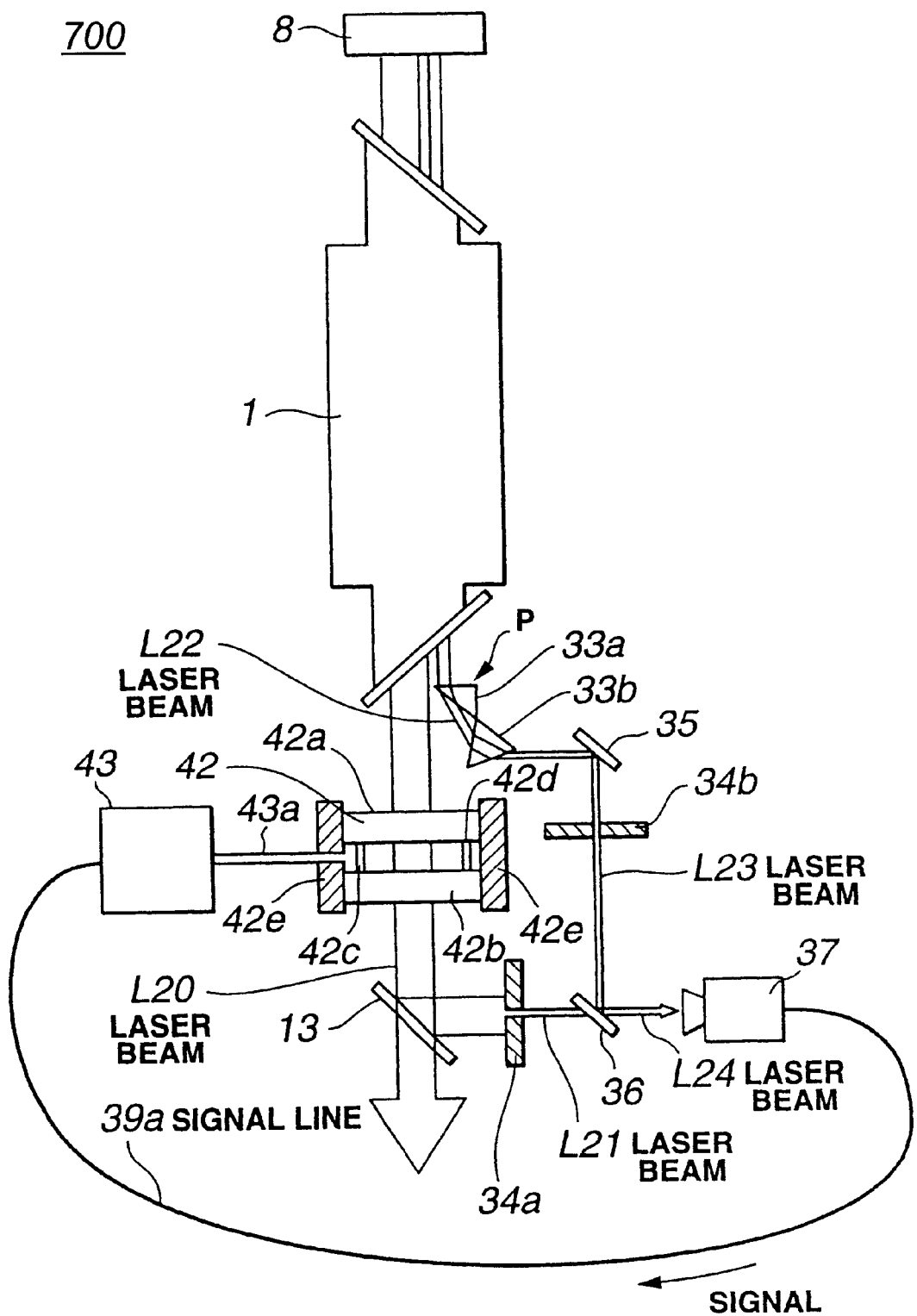
FIG. 20 is a configuration diagram representing the configuration of an ultra line-narrowed fluorine laser apparatus .700 relating to a eighth embodiment aspect.

FIG. 20 is a diagram of the configuration of an ultra line-narrowed fluorine laser apparatus 700 relating to an eighth embodiment aspect. The ultra line-narrowed fluorine laser apparatus 700 diagrammed in FIG. 20 is configured with the deletion of the output mirror 4, the etalon 56, the fully reflecting mirror 32, the two shutters 38a and 38b, the signal line 39b, the control unit 40, and the turning stage 41 in the configuration of the seventh embodiment aspect diagrammed in FIG. 18, and with the addition of an output mirror etalon 42 and a pressure control unit 43. In FIG. 20, furthermore, the components performing the same functions as the configuring elements diagrammed in FIG. 18 are indicated by the same symbols.

The output mirror etalon 42, which is a device that performs the functions of an output mirror, is configured by two base plates 42a and 42b, by a plurality (3, for example) of spacers interposed between these base plates for the purpose of maintaining a given distance between those base plates (with the two spacers 42c and 42d being indicated in FIG. 20), and by a member 42e for sealing in the space formed between the two base plates 42a and 42b.

In the member 42e is deployed one end of a tube 43a the other end whereof is deployed in the pressure control unit 43, and a hole is formed therein so that the gas pressure inside the output mirror etalon 42 in the sealed condition can be regulated by the pressure control unit 43 through the tube 43a.

In such an output mirror etalon 42 as this, when the gas pressure inside the output mirror etalon 42 is regulated by the pressure control unit 43, the transmitting wavelength varies according to that gas pressure, which is to say that the selected wavelength changes.

The pressure control unit 43 finely adjusts the gas pressure inside the output mirror etalon 42 through the tube 43a, based on signals indicating detection results from a spectroscope 37 received via a signal line 39a.

In the ultra line-narrowed fluorine laser apparatus 700 configured thusly, a first resonator is configured by a fully reflecting mirror 8 and the output mirror etalon 42, and a second resonator is configured by the fully reflecting mirror 8 and the front surface P of a prism 33a. A laser chamber 1 is deployed within the first resonator, that is, between the fully reflecting mirror 8 and the output mirror etalon 42.

What is different from the ultra line-narrowed fluorine laser apparatus 600 of the seventh embodiment aspect diagrammed in FIG. 18 in the ultra line-narrowed fluorine laser apparatus 700 in this embodiment aspect is the use in the latter of the fully reflecting mirror of the first resonator that generates with ultra line narrowing in the fully reflecting mirror that configures the second resonator.

Next, the stabilization of the wavelength of an ultra-line-narrowed laser beam by such an ultra line-narrowed fluorine laser apparatus 700 as this is described with reference to FIG. 20.

First, when a laser beam laser-oscillated from the laser chamber 1 strikes the fully reflecting mirror 8, is there fully reflected, returns again to the laser chamber 1 and passes therethrough, and is input to the output mirror etalon 42, the laser beam is made to resonate and changed to a single line between the fully reflecting mirror 8 and the output mirror etalon 42, and is further line-narrowed (that is, ultra-line-narrowed) by the output mirror etalon 42. Therefore, from the output mirror etalon 42 is output an ultra-line-narrowed laser beam 120.

This laser beam L20 strikes the beam splitter 13, a portion thereof is reflected, and that reflected portion strikes the pinhole 34a. The laser beam L21 that passes through that pinhole 34a strikes the beam synthesizer 36.

Meanwhile, in the second resonator where there is no line narrowing element, the laser beam oscillates between the fully reflecting mirror 8 and the front surface P of the prism 33a, and the two lines will oscillate as they are.

This oscillated laser beam L22 passes through the prism 33a and the prism 33b, is reflected by the mirror 35, and strikes the pinhole 34b. The laser beam L23 that passes through the hole formed in the pinhole 34b is made into a single line and strikes the beam synthesizer 36 where it is synthesized together with the laser beam 118 that is already being input thereto.

In other words, a laser beam L24 (wavelength $\lambda 1 = 157.6299$ nm) synthesized from the line-narrowed laser beam L21 (wavelength $\lambda 1 = 157.6299$ nm) and the laser beam L23 (wavelength $\lambda 1 = 157.6299$ nm) wherein the single line is as it is will be input to the spectroscope 37.

The spectroscope 37 measures the spectrum of the laser beam L24 synthesized in that manner and sends the results of that measurement via the signal line 39a to the pressure control unit 43.

The spectrum distribution based on the detection of the spectrum measured in the spectroscope 37 is now described with reference to FIGS. 21(a) to 21(c).

Figure 21A:
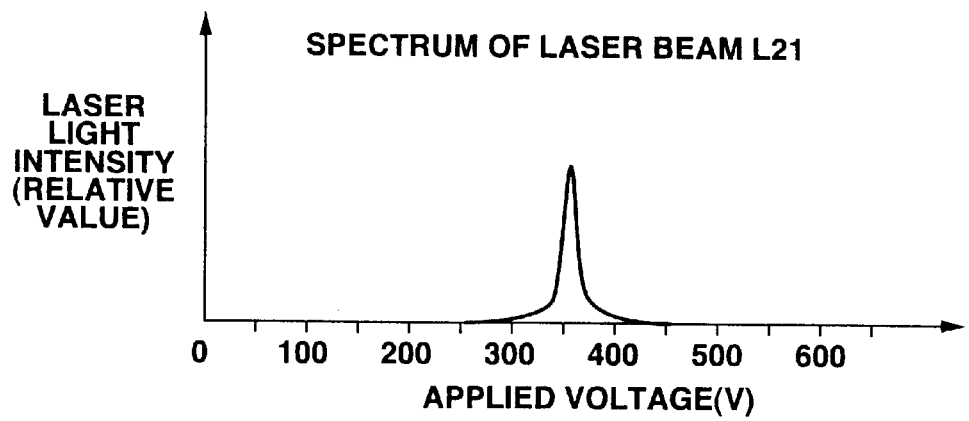
FIGS. 21(*a*) to 21(*c*) are diagrams for describing the spectrum of laser light in the ultra line-narrowed fluorine laser apparatus 700.
Figure 21B:
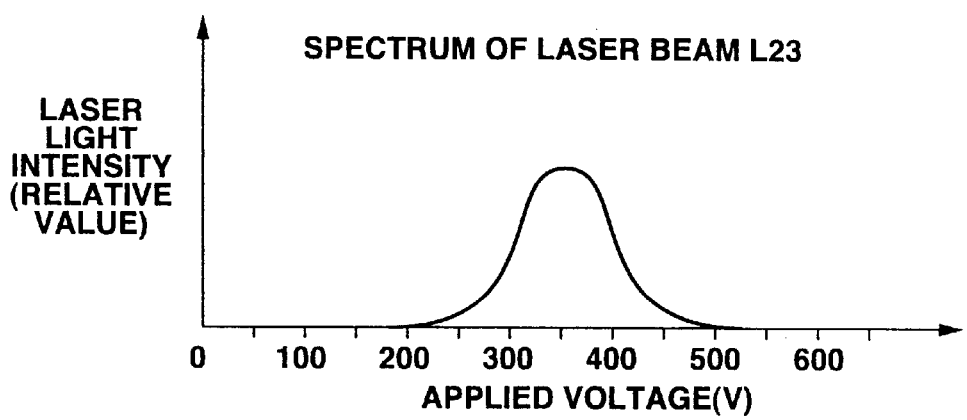
Figure 21C:
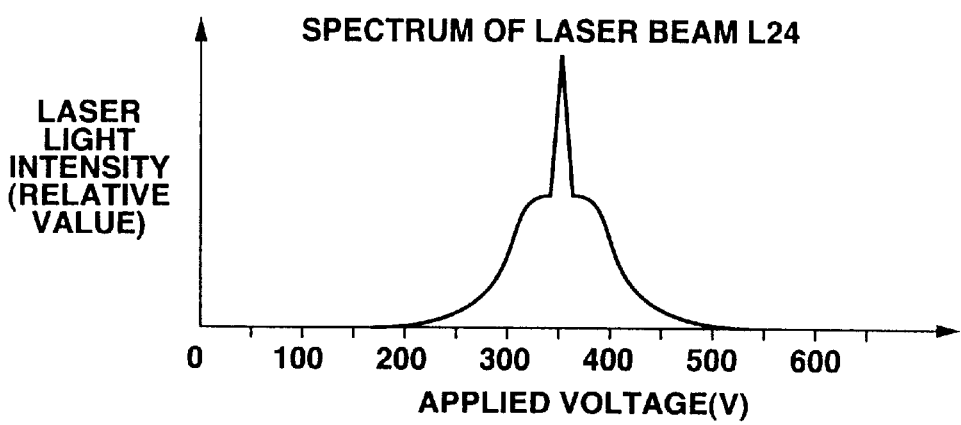

In FIG. 21(a) is represented the spectrum of the ultra-line-narrowed laser beam L21, in FIG. 21(b) is represented the spectrum of the laser beam L23 wherein the single line is as is (not ultra-line-narrowed), and in FIG. 21(c) is represented the spectrum of the laser beam L24 synthesized from the laser beam L21 and the laser beam L23.

In this embodiment aspect, only the spectrum for the laser beam L24 synthesized from the ultra-line-narrowed laser beam L21 and the laser beam L23, wherein the single line is as is, is measured.

Here, hypothetically, if the spectrum of the ultra-line-narrowed laser beam L21 is to be measured, the resulting distribution will have a sharp shape (that is, a spectrum having a narrow wavelength width), as diagrammed in FIG. 21(a), whereas, if the spectrum of the laser beam L23, wherein the single line is as is, is to be measured, the resulting distribution will have a broad mounded spectrum shape (spectrum having a broad wavelength width).

Also, the spectrum distribution for the laser beam L24 actually measured will have a sharp spectrum for the ultra-line-narrowed portion jutting out from the top of the broad mounded spectrum shape, as diagrammed in FIG. 21(c).

Furthermore, in the spectrum distribution for the laser beam diagrammed in FIG. 21(c), the center wavelength in the spectrum of the laser beam L23 that is not ultra-line-narrowed and the center wavelength in the spectrum of the laser beam L21 that is ultra-line-narrowed coincide, which means, therefore, that the center wavelength in the spectrum of the ultra-line-narrowed laser beam L24 is stabilized.

Here, the center wavelength in the spectrum of the laser beam L23 is absolutely unchangeable, irrespective of the gas pressure inside the output mirror etalon 42. That is, when the voltage applied to the piezo element is in the vicinity of 350 V, for example, the wavelength in the spectrum of the laser beam L23 will become the center wavelength.

In contrast therewith, the center wavelength in the spectrum of the laser beam L21 will shift to the right and left from a point in the vicinity of the 350V voltage applied to the piezo element, according to the gas pressure inside the output mirror etalon 42.

Thereupon, in cases where a laser beam spectrum distribution like that diagrammed in FIG. 21(c) is obtained with the spectroscope 37, the center wavelength in the spectrum of the laser beam L24 is stabilized, wherefore no fine adjustment is made in the gas pressure inside the output mirror etalon 42 by the pressure control unit 43, but that gas pressure is left as it is.

On the other hand, in a hypothetical case where, when the voltage applied to the piezo element is in the vicinity of 350 V, for example, a wavelength in the spectrum of the laser beam L21 is not the center wavelength, the center wavelengths in the spectrums of the laser beam L21 and the laser beam L23 diverge, and a spectrum distribution such as that diagrammed in FIG. 21(c) could not be obtained, the gas pressure inside the output mirror etalon 42 may be adjusted as described below.

That is, the pressure control unit 43, when a signal has been input via the signal line 39a that indicates detection results from the spectroscope 37 corresponding to a spectrum wherein two center wavelengths diverge, and not a laser beam spectrum distribution such as that diagrammed in FIG. 21(c), based on that signal indicating those detection results, finely adjusts the gas pressure inside the output mirror etalon 42 so that a sharp portion comes to the center of the mounded shape.

In this manner, the transmitting wavelengths in the output mirror etalon 42 are finely adjusted so that the center wavelength in the wide spectrum of the laser beam L23 that is not ultra-line-narrowed coincides with the center wavelength in the spectrum of the ultra-line-narrowed laser beam L21, thus stabilizing the wavelength in the spectrum of the ultra-line-narrowed laser beam L20.

Based on this eighth embodiment aspect, as described in the foregoing, one may expect the same operational benefits as in the seventh embodiment aspect described earlier.

Ninth Embodiment Aspect

Figure 22:
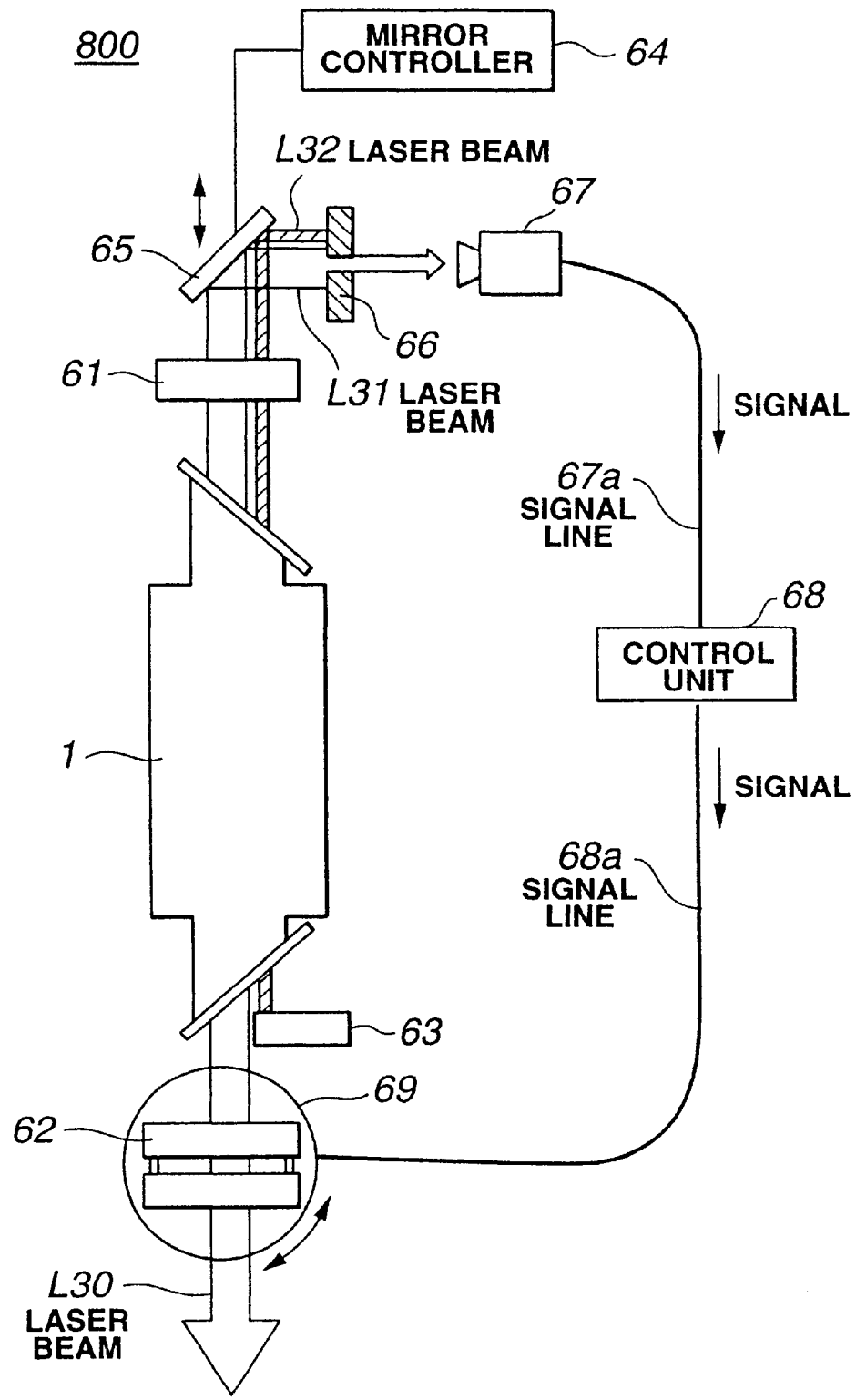
FIG. 22 is a configuration diagram representing the configuration of an ultra line-narrowed fluorine laser apparatus 800 relating to a ninth embodiment aspect.

FIG. 22 is a configuration diagram for an ultra line-narrowed fluorine laser apparatus 800 relating to a ninth embodiment aspect.

In general, in a fully reflecting mirror used in a fluorine laser, the reflectance is somewhere around 92% at best, whereupon the remaining 8% of the laser light in the input laser beam is either absorbed or transmitted. More specifically, of that 8% of the laser light of the input laser beam, a portion will be absorbed into the reflecting film and substrate, and the other several percent will be transmitted. That being so, in this embodiment aspect, the laser apparatus is embodied on the basis of a thorough recognition of the characteristics of the optical members used in such fluorine lasers.

In the ultra line-narrowed fluorine laser apparatus 800 diagrammed in FIG. 22, a first resonator is configured by a fully reflecting mirror 61 and an output mirror etalon 62, and therebetween is deployed a laser chamber 1.

Also, a second resonator is configured by a fully reflecting mirror 63 and the fully reflecting mirror 61 used in the first resonator for effecting line narrowing, and a laser chamber is deployed inside that second resonator.

A mirror controller 64 moves the position of a movable mirror 65 so that the length of the light path formed by that movable mirror 65 and the fully reflecting mirror 61 varies.

A laser beam L32 wherein the single line is as is and an ultra-line-narrowed laser beam L31 passed through the fully reflecting mirror 61 are reflected by the movable mirror 65 and strike a pinhole 66.

The laser beam that passes through the hole formed in that pinhole 66 is input to a spectroscope 67, according to the position of the movable mirror .65.

The spectroscope 67, which is a device having the same functions as the spectroscope 37 in the seventh embodiment aspect diagrammed in FIG. 18, detects the spectrum of input laser beams and sends a signal indicating the results of such detections to a control unit 68 via a signal line 67*a*.

The control unit 68, which has the same functions as the control unit 50 in the seventh embodiment aspect diagrammed in FIG. 18, based on signals indicating detection results from the spectroscope 67 input via the signal line 67*a*, controls the turning of a turning stage 69 to which the output mirror etalon 62 is secured, via a signal line 68*a*.

When this turning stage 69 turns, the output mirror etalon 62 secured to that turning stage 69 also turns in conjunction therewith, so that the angle of incidence of the laser beam input to the output mirror etalon 62 is changed.

Next, the stabilization of the wavelength of the ultra-line-narrowed laser beam performed by the ultra line-narrowed fluorine laser apparatus 800 configured thusly is described with reference to FIG. 22.

Let it here be assumed that the movable mirror 65 is currently at a position whereat the laser beam L31 can pass through the hole in the pinhole 66.

First, the laser beam laser-oscillated from the laser chamber 1 strikes the fully reflecting mirror 61 and is reflected according to the 92% or so reflectance thereof, returns again to the laser chamber 1 and passes therethrough, and is input to the output mirror etalon 62, whereupon the laser beam oscillates between the fully reflecting mirror 61 and the output mirror etalon 42 and is changed to a single line, and then is further line-narrowed (ultra-line-narrowed) by the output mirror etalon 42. Thus an ultra-line-narrowed laser beam L30 is output from the output mirror etalon 42.

Also, several percent of the laser beam ultra-line-narrowed by the output mirror etalon 62 as described in the foregoing will be transmitted through'the fully reflecting mirror 61 (thus constituting the transmitted laser beam L31).

Simultaneously therewith, the laser beam laser-oscillated from the laser chamber 1 is made to oscillate between the fully reflecting mirror 61 and the fully reflecting mirror. 63, and several percent of the laser light of the laser beam thus changed to a single line is transmitted through the fully reflecting mirror 61 (constituting, that is, the transmitted laser beam L32).

The laser beams L31 and L32 transmitted in this manner through the fully reflecting mirror 61 are reflected by the movable mirror 65 and strike the pinhole 66. At this point in time, however, the movable mirror 65 is deployed in a prescribed first position, under the control of the mirror controller 64, so that only the laser beam L31 can pass through the hole in the pinhole 66, wherefore the laser beam L31 is output from that hole in the pinhole 66.

When this laser beam L31 is input to the spectroscope 67, the spectroscope 67 detects the spectrum of that laser beam L31, and sends a signal indicating those detection results to the control unit 68 via the signal line 67*a*.

Next, when the movable mirror 65 is moved from the prescribed first position to a prescribed second position by the mirror controller 64, so that only the laser beam L32 can pass through the hole in the pinhole 66, the laser beam L32 is output from the hole in the pinhole 66.

When this laser beam L32 is input to the spectroscope 67, the spectroscope 67 detects the spectrum of that laser beam L32, and sends a signal indicating those detection results to the control unit 68 via the signal line 67*a*.

By controlling the movement of the movable 65 to the prescribed first or second positions by the mirror controller 64 in this manner, the spectroscope 67 can alternately detect the spectrums of the laser beams L31 and L32 that pass through the hole in the pinhole 66.

Accordingly, the spectroscope 67 can obtain both the results of the detection of the spectrum of the ultra-line-narrowed laser beam L31 and the results of the detection of the spectrum of the laser beam L32 wherein the single line is as is.

The timing wherewith the mirror controller 64 controls the movement of the movable mirror 65 may be made that point in time when a prescribed time is reached that is longer than the prescribed time during which the spectroscope 67 can detect the laser beam spectrum. Alternatively, provision may be made so that the spectroscope 67 notifies the mirror controller 64 when it has finished detecting the spectrum of a laser beam, and so that the mirror controller 64, upon receiving that notification that detection is finished, thereupon executes the controlled movement of the movable mirror 65.

The control unit 68, upon receiving a signal indicating the results of the detection of the spectrums of the laser beams L31 and L32, executes control processing in a similar manner to the control unit 40 in the seventh embodiment aspect described in the above, based on the measurement results from the spectroscope 67.

That is, the control unit 68, based on a signal indicating the results of the detection of the spectrums of the laser beams L31 and L32 as diagrammed in FIGS. 19(*a*) and 19(*b*), controls the turning of the turning stage 69, via the-signal line 78*a*, so that the center wavelength in the wide spectrum of the laser beam L32 that is not ultra-line-narrowed is made to coincide with the center wavelength in the spectrum of the ultra-line-narrowed laser beam L31.

Furthermore, for the means for adjusting the center wavelength in the spectrum of the laser beam L31, means for adjusting pressure, as in the output mirror etalon 62 diagrammed in FIG. 20, may be used.

Thus it is possible to separately measure, with the spectroscope 67, the laser beams L31 and L32 that pass through the fully reflecting mirror 61 used in both the second resonator and in the first resonator for effecting line narrowing, and, based on the results of those measurements, to effect stabilization of the center wavelength in the spectrum of the ultra-line-narrowed laser beam L30.

Based on this ninth embodiment aspect, as described in the foregoing, one may expect operational benefits like those provided by the seventh embodiment aspect described earlier.

Furthermore, because the several percent of the laser beam leaking from the fully reflecting mirror 61 is used as the laser beam for stabilizing the center wavelength of the ultra-line-narrowed laser beam L30, the center wavelength of the laser beam L30 can be stabilized without extracting a portion of the laser beam L30 extracted from the output mirror etalon 62. In addition, because the laser beam L30 used in making exposures does not diminish, the stabilization of the center wavelength of the laser beam L30 can be effected while raising laser beam output efficiency.

Tenth Embodiment Aspect

Figure 23:
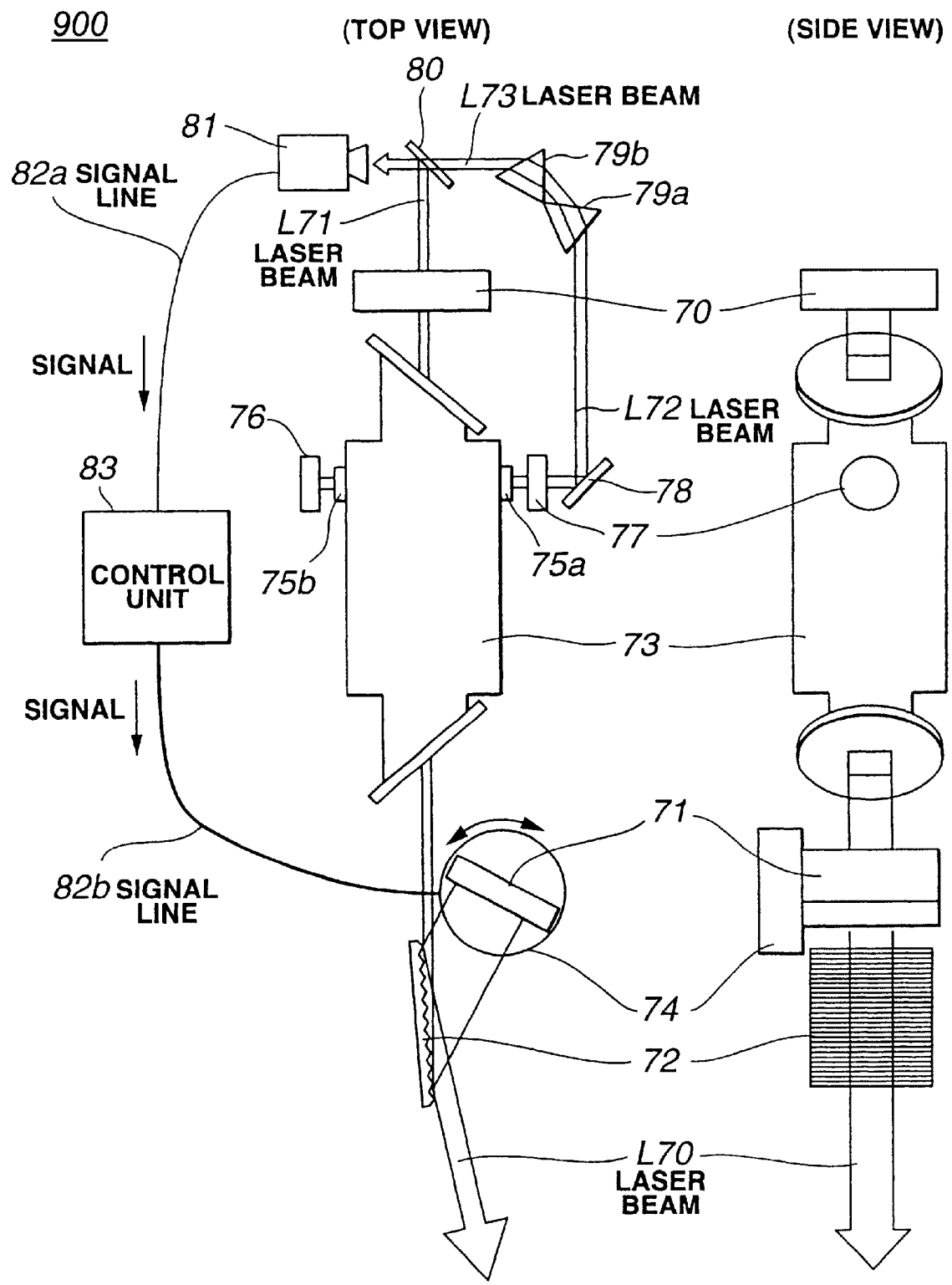
FIG. 23 is a configuration diagram representing the configuration of an ultra line-narrowed fluorine laser apparatus 900 relating to a tenth embodiment aspect.

FIG. 23 is a configuration diagram of an ultra line-narrowed fluorine laser apparatus 900 relating to a tenth embodiment aspect. FIG. 23(a) provides a top view of that laser apparatus 900, while FIG. 23(b) provides a side view thereof In this embodiment aspect, a first resonator for effecting line narrowing is configured by a fully reflecting mirror 70 and a tuning mirror 71, inside of which first resonator is deployed a laser chamber 73 and a diffraction grating 72 as the line narrowing element. A second resonator that does not effect line narrowing is configured in a direction perpendicular to the longitudinal direction of the first resonator for effecting line narrowing, through two windows 75a and 75b provided in the side of the laser chamber 73.

Also, a slender electrical discharge unit (not shown), configured by a cathode and an anode so as to sandwich the optical axis of the laser beam therebetween, is deployed so as to extend in the longitudinal direction of the first resonator. For the amplification medium in the second resonator that is deployed perpendicular to the longitudinal direction of the first resonator, only a slight proportion of the slender discharge unit is used.

A diffraction grating 72 is deployed so that the light axis of the laser beam output from the laser chamber 73 is bent. The tuning mirror 71 is deployed so as to fully reflect the diffracted light diffracted by that diffraction grating 72.

The diffraction grating 72 is deployed so that the laser beam is input with an angle of incidence that is approximately 80 degrees or more, so that it will function as an oblique incidence type diffraction grating. Refraction and reflection are performed in this diffraction grating 13, and the refracted laser beam is reflected by the tuning mirror so that it returns to the diffraction grating 72, while the reflected laser beam is output to the outside.

The purposes for causing the diffraction grating 72 to function as an oblique incidence diffraction grating in this manner, and fully reflecting the refracted light by the tuning mirror 71, are to cause the laser beam from the laser chamber 73 to irradiate the plurality of groove lines forming the diffraction grating 72, and also to cause the reflected light (output light) from the tuning mirror to irradiate that plurality of groove lines.

In other words, in view of the fact that, in general, the more the number of groove lines covered by a laser beam irradiating a diffraction grating the more line narrowing can be effected, provision is made so that the beam from the tuning mirror 71 is made to irradiate a wider ranging area, that is, more groove lines, in the diffraction grating 72.

For this reason, the tuning mirror 71 is deployed secured to a turning stage 74, and controlled by a control unit 83 so that it turns in a prescribed direction. That is, the installation angle of the tuning mirror 71 is regulated.

When the installation angle of the tuning mirror 71 varies in this manner, the proportion of the laser beam from the tuning mirror 71 irradiating the plurality of groove lines formed in the diffraction grating 72 changes, and the selected wavelength(s) also change(s).

Furthermore, the diffraction grating 72 and the tuning mirror 71 function as an output mirror, and it is from the diffraction grating 72 that the line-narrowed laser beam is actually output. Also, because the diffraction grating 72 where a laser beam L70 is extracted is an oblique incidence type, although diffraction efficiency is low at 10 to 20%, when applied in a fluorine ($F_2$) laser, the diffraction grating 72 and tuning mirror 71 function as an output mirror of high transmittance.

Next, the stabilization of the wavelength of the ultra-line-narrowed laser beam by the ultra line-narrowed fluorine laser apparatus 900 configured thusly is described with reference to FIG. 23.

When a laser beam output from the laser chamber 73 is input to the diffraction grating 72, in that diffraction grating 72, some of the laser light is diffracted, and the rest of the laser light is reflected.

The laser beam that is refracted by the diffraction grating 72 (refracted light) strikes the tuning mirror 71, and the laser beam reflected by that tuning mirror 71 is input again to the diffraction grating 72. This input laser beam returns to the laser chamber 73, passes therethrough, and strikes the fully reflecting mirror 70, whereby the laser beam oscillates between the fully reflecting mirror 70 and the tuning mirror 71 (within the first resonator) and is ultra-line-narrowed.

Several percent of the laser light of that laser beam (wavelength $\lambda 1=157.6299$ nm) ultra-line-narrowed in that manner, that is, the laser beam L71 that passes through the fully reflecting mirror 70 and is taken out to the outside, strikes a beam synthesizer 80.

Meanwhile, the ultra-line-narrowed laser beam L70 reflected by the diffraction grating 72 is used as the exposure light in the fluorine exposure tool (not shown).

Simultaneously with such line narrowing action, in the second resonator configured by a fully reflecting mirror 76 and output mirror 77, a laser beam (a wide-spectrum double-line laser beam) passes through the two windows 75a and 75b and is taken out. The laser beam L72 having the wide spectrum as is extracted from the output mirror 77, after striking a mirror 78, advances to two prisms 79a and 79b. A laser beam L73 (wavelength $\lambda 1=157.6299$ nm) changed to a single line by these prisms strikes the beam synthesizer 80.

For this reason, both the ultra-line-narrowed laser beam L71 and the laser beam L73 wherein the single line is as is will be input to a spectroscope 81. Therefore, in the spectroscope 81, as in the eighth embodiment aspect described earlier, a laser beam spectrum will be detected like that resulting from the synthesis of the ultra-line-narrowed laser beam L71 and the laser beam L73 wherein the single line is as is (cf. FIG. 21(c)).

Here, hypothetically, if the ultra-line-narrowed laser beam L71 were detected by the spectroscope 81, a laser beam spectrum distribution such as diagrammed in FIG. 21(a) would result, whereas, if the laser beam L73 wherein the single line is as is were detected by the spectroscope 81, a laser beam spectrum distribution such as is diagrammed in FIG. 21(b) would result.

Now, when the spectroscope 81 detects a laser beam spectrum such as diagrammed in FIG. 21(c), a signal indicating the results of the detection of that laser beam spectrum is sent via a signal line 82a to the control unit 83.

Thereupon the control unit 83; based on signals indicating the input detection results, controls the turning of the turning stage 74 via the signal line 82b.

In conjunction with the turning of this turning stage 74 the tuning mirror 71 is also turned and the setting angle thereof is finely adjusted. As a consequence thereof, the domain (area) of the diffraction grating 72 wherein the plurality of groove lines are irradiated by the reflected light from the tuning mirror 71 also changes. Accordingly, the selection wavelength(s) of the diffraction grating 72 also change(s), and line narrowing can be effected.

Here, in the laser beam spectrum distribution diagrammed in FIG. 21(c), as described in the eighth embodiment aspect, the center wavelength in the spectrum of the ultra-line-narrowed laser beam L21 means that stabilization is being effected, wherefore, in this tenth embodiment aspect also, when a laser beam spectrum like that diagrammed in FIG. 21(c) is detected by the spectroscope 81, the center wavelength in the spectrum of the laser beam L70 is stabilized, wherefore the tuning mirror 71 does not turn under the control of the control unit 83 but remains as it is.

In contrast therewith, in the case where the sharp portion in the laser beam spectrum distribution diagrammed in FIG. 21(c), that is, the center wavelength in the spectrum of the ultra-line-narrowed laser beam L71, is not positioned at the center wavelength in the wide spectrum of the laser beam L73 that is not ultra-line-narrowed, but diverges from that wavelength, the tuning mirror 71 will not be deployed at the desired setting angle, and so will be turned under the control of the control unit 83.

In the embodiment aspect described in the foregoing, a first resonator and a second resonator are deployed at right angles, but this is not a limitation, and the first resonator and second resonator may be deployed so that they cross at some angle other than 90 degrees.

In this case, in the interest of suppressing laser light loss in the two windows 75a and 75b, it is preferable that the first resonator and second resonator be deployed, relative to the windows 75a and 75b, so that they cross such that the laser beam oscillating between the fully reflecting mirror 76 and the output mirror 77 are input and output at roughly the Brewster's angle, for example.

In such a configuration also, as when these two resonators are deployed at right angles, for the amplifying medium in the second resonator, only a slight proportion of the slender discharge unit deployed so that it extends in the longitudinal direction of the first resonator is used.

Based on this tenth embodiment aspect, as described in the foregoing, one can expect the same operational benefits as with the seventh embodiment aspect described earlier.

Also, because the second resonator that does not effect line narrowing is deployed so that it crosses (inclusive of perpendicular crossing) the longitudinal direction of the first resonator that does effect line narrowing, for the amplifying medium in the second resonator, only a slight proportion of the slender discharge unit deployed so that it extends in the longitudinal direction of the first resonator is used, wherefore the laser output of the line-narrowed laser beam L72 oscillated from the second resonator can be sharply lowered, and it becomes easy to suppress declines in the laser output of the ultra-line-narrowed laser beam L70.

11th Embodiment Aspect

Figure 24:
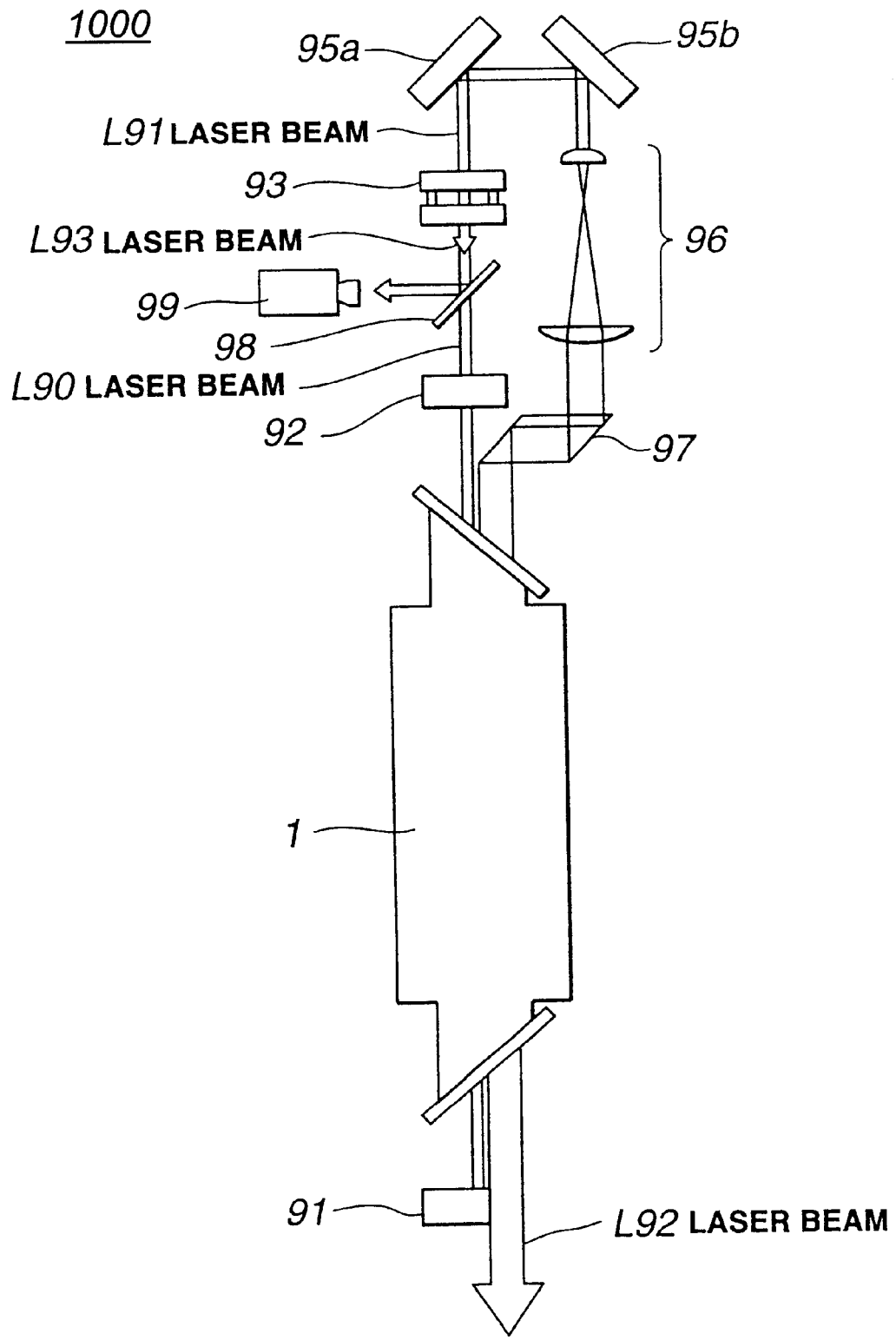
FIG. 24 is a configuration diagram representing the configuration of an ultra line-narrowed fluorine laser apparatus 1000 relating to a eleventh embodiment aspect.

FIG. 24 is a configuration diagram of an ultra line-narrowed fluorine laser apparatus 1000 relating to an 11th embodiment aspect.

This ultra line-narrowed fluorine laser apparatus 1000 has both an oscillating stage and an amplifying stage provided in one laser chamber 1, as diagrammed in FIG. 24. The oscillating stage is configured by a fully reflecting mirror 91, and output mirror 92, an etalon 93, a mirror 95a, and a laser chamber 1. The amplifying stage is configured by a mirror 96b, a beam expander 96, a shift prism 97, and the laser chamber 1.

The resonator of the oscillating stage is configured by the fully reflecting mirror 91 and the output mirror 92, whereby a laser beam L90 that is not line-narrowed is oscillated. That is, the oscillating stage configured with the fully reflecting mirror 91 and the output mirror 92 is equivalent to the second resonator where line narrowing is not effected.

Between the output mirror 92 and the etalon 93 that has the same functions as the etalon 56 diagrammed in FIG. 18 is deployed a beam splitter 98 so that a laser beam L93 that strikes the etalon 93, and is reflected so as to return, is reflected to a spectroscope 99.

Next, the stabilization of the wavelength of the ultra-line-narrowed laser beam by the ultra line-narrowed fluorine laser apparatus 900 is described with reference to FIG. 24.

In the oscillating stage, the laser beam L90 output from the laser chamber 1 passes through the beam splitter 98 and advances into the etalon 93. The laser beam L91 output from this etalon 93 becomes an ultra-line-narrowed laser beam that is reflected by the mirror 95a and input to the amplifying stage.

In this amplifying stage, the ultra-line-narrowed laser beam L91 output from the etalon 93 is turned back by the mirrors 95a and 95b, and the beam width thereof is expanded by being passed through the beam expander 96.

This laser beam that has its beam width expanded passes through the shift prism 97, whereupon the beam position is subjected to a parallel shift. After that the laser beam is input again to the laser chamber 1 and amplified by passing therethrough.

From the laser chamber 1 that is an element in the amplifying stage is extracted a laser beam L92 that is a laser beam which is both ultra-line-narrowed and amplified.

In the oscillating stage, furthermore, when the laser beam L93 that struck the etalon 93 and was reflected and returned is reflected to the beam splitter 98 and input to the spectroscope 99, the spectroscope 99 detects the spectrum of the input laser beam L93. The results of this detection are the spectrum distribution of a laser beam such as is diagrammed in FIG. 25(c), for example.

The measured laser beam spectrum distribution is here described with reference to FIGS. 25(a) to 25(c).

Figure 25A:
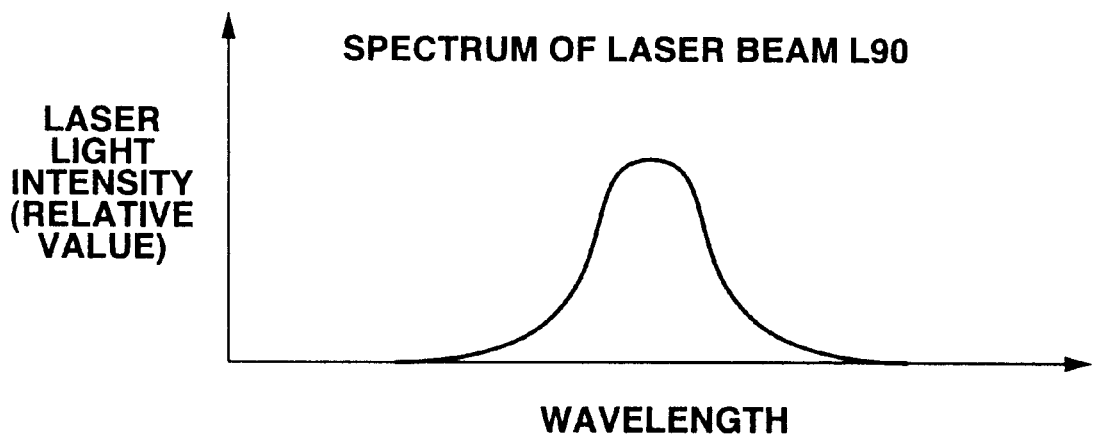
FIGS. 25(*a*) to 25(*c*) are diagrams for describing the spectrum of laser light in the ultra line-narrowed fluorine laser apparatus 1000.
Figure 25B:
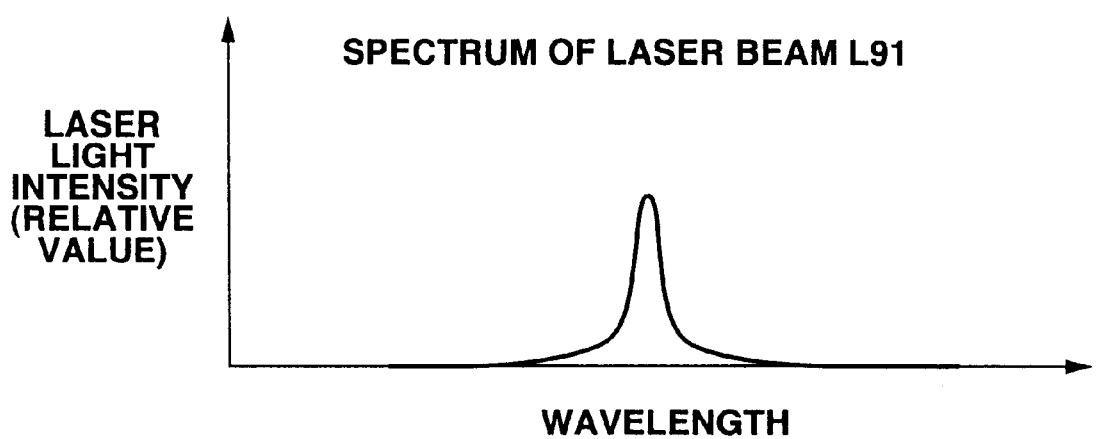

The spectrum distribution of the non-ultra-line-narrowed laser beam L90 extracted from the oscillation stage is a wide spectrum (spectrum having a broad wavelength width) distribution such as that diagrammed in FIG. 25(a), while the spectrum distribution of the ultra-line-narrowed laser beam L91 that passed through the etalon 93 is a sharp spectrum (spectrum having a narrow wavelength width) distribution such as that diagrammed in FIG. 25(b). Moreover, the laser beam spectrums diagrammed in FIGS. 25(a) and 25(b) are not actually detected by the spectroscope 99, but are represented to facilitate description.

Figure 25C:
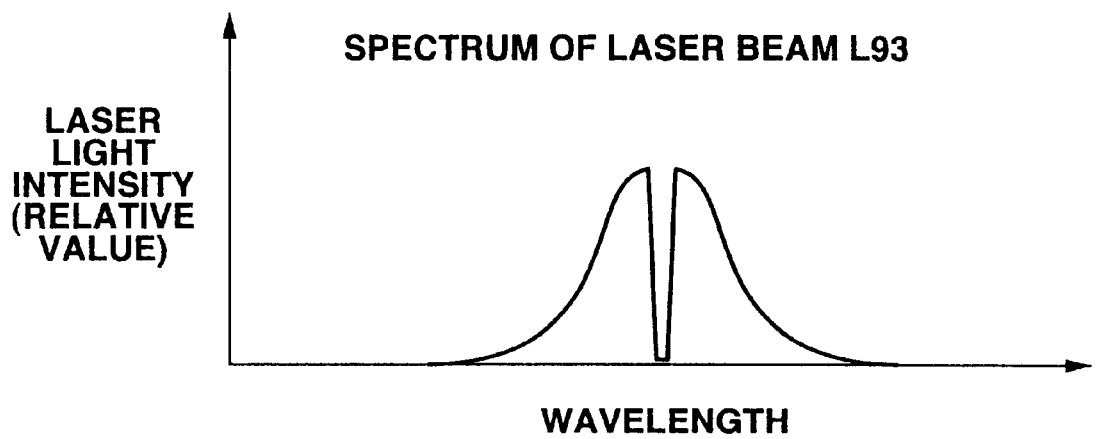

Now, the laser beam L93 reflected by the etalon 93 and returned is the result of subtracting the laser beam L91 from the laser beam L90, wherefore the spectrum distribution for the laser beam L93 detected by the spectroscope 99 will take on a shape having a sharp depression in the center thereof as diagrammed in FIG. 25(c).

Thereupon, for stabilizing the center wavelength of the laser beam L91 in this embodiment, feedback is continuously provided to the etalon 93 so that the depression in the waveform of the spectrum diagrammed in FIG. 25(c) comes to the overall center.

As to the procedure for effecting that feedback, the angle of deployment (setting angle) of the etalon 93 may be finely regulated as was described in the seventh embodiment aspect diagrammed in FIG. 18, or, alternatively, the pressure of the gas inside the etalon 93 may be finely regulated as was described in the eighth embodiment aspect diagrammed in FIG. 20.

More specifically, in the former case, the etalon 93 may be secured to a turning stage and the turning of that turning stage controlled by a control unit, as in the configuration diagrammed in FIG. 18. In the latter case, on the other hand, the etalon 93 may be configured so that the interior thereof is airtight, and the gas pressure in that interior regulated by a pressure control unit, as in the configuration diagrammed in FIG. 20.

Based on this 11th embodiment aspect, as described in the foregoing, even when the laser apparatus is provided with both an oscillating stage and an amplifying stage in one laser chamber 1, one can expect the same operating benefits as with the seventh embodiment aspect described earlier.

Because control is effected so that the center wavelength (that is, an absolute wavelength) in the spectrum of a laser beam that is not ultra-line-narrowed coincides with the center wavelength in the spectrum of an ultra-line-narrowed laser beam, for example, the center wavelength in the spectrum of the ultra-line-narrowed laser beam can be definitely stabilized.

12th Embodiment Asp

Figure 26:
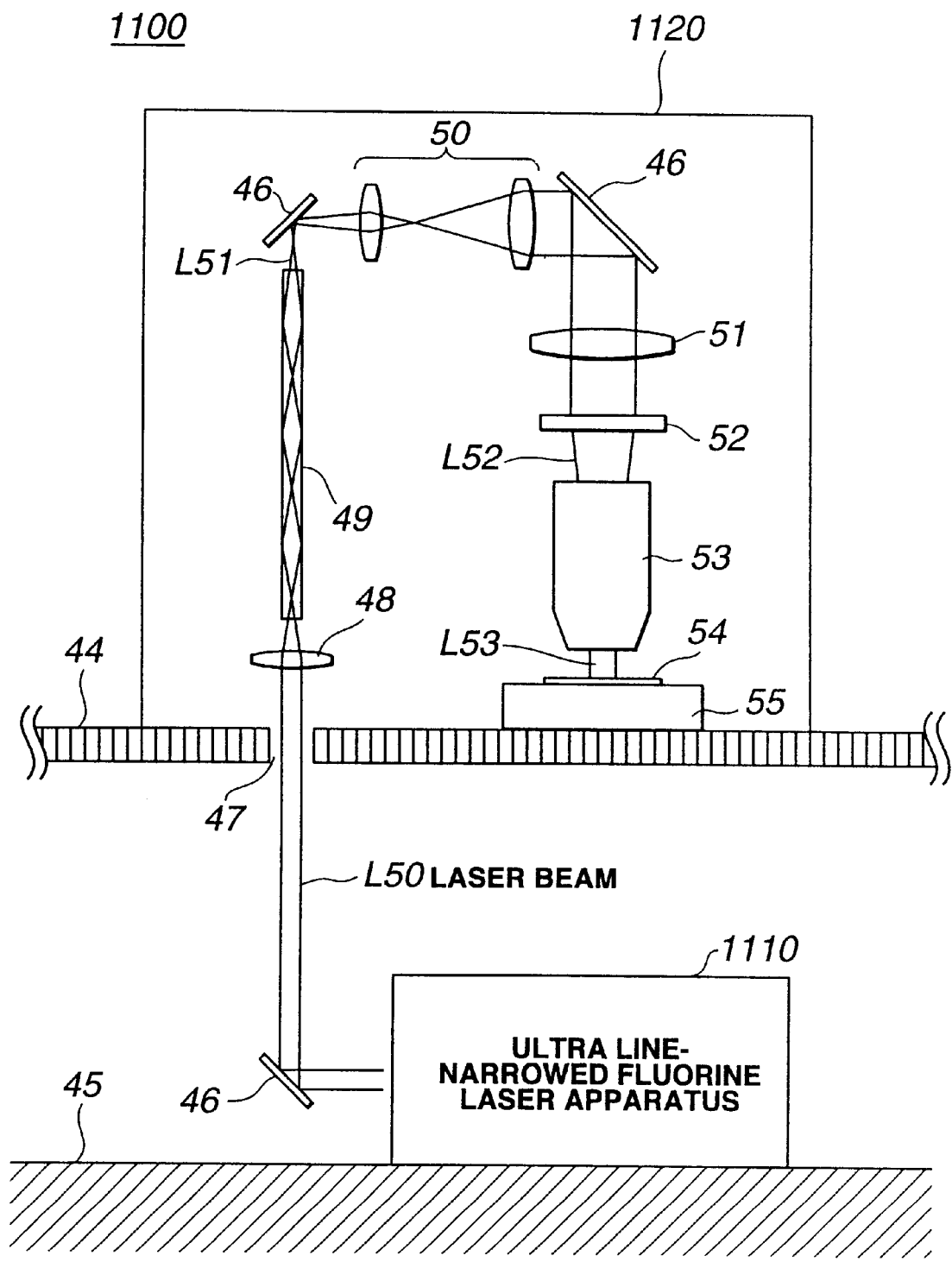
FIG. 26 is a configuration diagram representing the configuration of a fluorine exposure tool 1100 relating to a 12th embodiment aspect.

FIG. 26 is a configuration diagram representing a fluorine exposure tool 1100 wherein an ultra line-narrowed laser apparatus is employed.

This fluorine exposure tool 1100, broadly speaking, is configured by an ultra line-narrowed laser apparatus 1110 diagrammed in FIG. 18 and an exposure tool main unit 1120.

The exposure tool main unit 1120 is installed on a grating 44 in a clean room. The ultra line-narrowed laser apparatus 1110 is installed on the floor 45 of a floor (a floor generally called a sub-floor) beneath the grating 44.

A laser beam L50 having only a strong line (oscillation line) with a wavelength width of approximately 0.2 pm is taken from the ultra line-narrowed laser apparatus 1110, reflected by a mirror 46a so that it advances upward, passes through an opening 47 in the grating 44, and advances into the exposure tool main unit 1120.

The laser beam L50 is narrowed by a lens 48, from there advances into a glass rod 49 made of calcium fluoride, and, by being repeatedly fully reflected in the interior thereof, is output as the laser beam L51 the beam intensity distribution wherein is made uniform.

This laser beam L51 is reflected by a mirror 46b, has its beam cross-section broadened as it passes through a beam warper 50, is then reflected by a mirror 46c, passes through a condenser lens 51, and irradiates a reticle 52.

The laser beam L52 irradiating the reticle 52 passes through a reduction projection lens 53 and strikes a wafer 54. That is, an exposure is made in the pattern shape in the reticle 52 by the pattern in the reticle 52 being transferred onto the wafer 54 by the reduction projection lens 53. The wafer 54 is mounted on a stage 55.

In the fluorine exposure tool 1100 of this embodiment aspect, a reduction projection lens 53 is employed as the reduction projection optical system, which reduction projection lens 53 is configured by a monochromatic lens made of calcium fluoride.

The reason why it is possible to use a reduction projection optical system consisting only of a lens as described above is that the chromatic aberration in the reduction projection lens 53 can be disregarded because the wavelength width of the laser beam L50 taken from the ultra line-narrowed laser apparatus 1110 is approximately one tenth the width of a conventional fluorine laser.

That being so, the configuration of the exposure tool main unit 1120 becomes equivalent to that of a conventional KrF exposure tool. The only major difference is that the material of the lens has been changed from quartz to calcium fluoride. Thus the design of the reduction projection lens becomes the same as for the conventional tool, so that design costs can be sharply reduced.

Based on this 12th embodiment aspect, as described in the foregoing, in the fluorine exposure tool, an all refraction type reduction projection optical system can be used, without sharply raising the cost of the fluorine laser apparatus (i.e. the ultra line-narrowed fluorine laser apparatus), and without laser efficiency sharply deteriorating.

In other words, the reduction projection optical system can be designed in the same way as in a conventional KrF exposure tool. That is, it will be possible to employ simulation tools like those used conventionally, to design the reduction projection optical system in a short time, and to sharply reduce labor costs, thus making it possible to provide a fluorine exposure tool that has been made into a marketable product in a short time at low cost.

What is claimed is:

1. A wavelength detection device used in a line-narrowed laser apparatus which outputs a narrowed oscillation line that has been amplified and narrowed and which includes a laser chamber for generating spontaneous emission beams by discharging and exciting a laser medium accommodated in the laser chamber; a resonator for amplifying the spontaneous emission beams by moving the spontaneous emission beams back and forth on a path that sandwiches the laser chamber; and a line narrowing element, disposed on the path, for narrowing the spontaneous emission beams by transmitting therethrough or reflecting thereat the spontaneous emission beams to thereby narrow a line width and select a wavelength, the wavelength detection device being arranged for detecting, on the basis of a wavelength of a reference light, a wavelength of the narrowed oscillation line, wherein:

of the spontaneous emission beams generated by the laser chamber, a spontaneous emission beam whose wavelength approximates the narrowed oscillation line and whose light intensity is a certain level or higher, is taken out of the path without being transmitted through or reflected at the line narrowing element and used as a reference light.

2. A wavelength detection device used in a line-narrowed molecule fluorine laser apparatus which outputs a molecule fluorine narrowed oscillation line that has been amplified and narrowed and which includes a laser chamber for generating molecule fluorine spontaneous emission beams by discharging and exciting a laser medium accommodated in the laser chamber; a resonator for amplifying the molecule fluorine emission beams by moving the molecule fluorine emission beams back and forth on a path that sandwiches the laser chamber: and a line narrowing element, disposed on the path, for narrowing the molecule fluorine emission beams by transmitting therethrough or reflecting thereat the molecule fluorine emission beams to thereby narrow a line width and select a wavelength, the wavelength detection device being arranged for detecting, on the basis of a wavelength of a reference light, a wavelength of the narrowed oscillation line, wherein:

the narrowed oscillation line is guided onto one-dimensional or two-dimensional image sensors or a diode array;

the molecule fluorine emission beams generated by the laser chamber are taken out of the path without being transmitted through or reflected at the line narrowing element and guided onto a line sensor; and a wavelength of the narrowed oscillation line is detected, based on detected position of one or two of the molecule fluorine emission beams guided onto the one-dimensional or two-dimensional image sensors or the diode array and detected position of the narrowed oscillation line guided onto the one-dimensional or two-dimensional image sensors or the diode array.

3. A wavelength detection device used in a line-narrowed molecule fluorine laser apparatus which outputs a molecule fluorine narrowed oscillation line that has-been amplified and narrowed and which includes a laser chamber for generating molecule fluorine spontaneous emission beams by discharging and exciting a laser medium accommodated in the laser chamber; a resonator for amplifying the molecule fluorine emission beams by moving the molecule fluorine emission beams back and forth on a path that sandwiches the laser chamber, and a line narrowing element, disposed on the path, for narrowing the molecule fluorine emission beams by transmitting therethrough or reflecting thereat the molecule fluorine emission beams to thereby narrow a line width and select a wavelength, the wavelength detection device being arranged for detecting, on the basis of a wavelength of a reference light, a wavelength of the narrowed oscillation line, wherein:

the wavelength detection device comprises:

light interruption means for interrupting the molecule fluorine emission beams generated by the laser chamber for a certain time period on the path so that the molecule fluorine emission beams are not transmitted through or reflected at the line narrowing element; and wherein:

the molecule fluorine emission beams interrupted by the light interruption means are taken out of the path and one or, alternatively, two of the molecule fluorine emission beams are used as a reference light.

4. A wavelength detection device used in a line-narrowed molecule fluorine laser apparatus which outputs a molecule fluorine narrowed oscillation line that has been amplified and narrowed and which includes a laser chamber for generating molecule fluorine spontaneous emission beams by discharging and exciting a laser medium accommodated in the laser chamber; a resonator for amplifying the molecule fluorine emission beams by moving the molecule fluorine emission beams back and forth on a path that sandwiches the laser chamber; and a line narrowing element, disposed on the path, for narrowing the molecule fluorine emission beams by transmitting therethrough or reflecting thereat the molecule fluorine emission beams to thereby narrow a line width and select a wavelength, the wavelength detection device being arranged for detecting, on the basis of a wavelength of a reference light, a wavelength of the narrowed oscillation line, wherein:

the wavelength detection device comprises:

installation angle changing means for changing, during the a certain time only, an installation angle of the line narrowing to an installation angle at which the molecule fluorine element emission beams generated by the laser chamber are not line-narrowed; and wherein:

the molecule fluorine emission beams transmitted through or reflected at the line narrowing element whose installation angle is being changed by the installation angle changing means are taken out of the path and one or, alternatively two of the molecule fluorine emission beams is used as the reference light.

5. A line-narrowed molecule fluorine laser apparatus for outputting a molecule fluorine narrowed oscillation line that has been amplified and narrowed, comprising a laser chamber for generating molecule fluorine spontaneous emission beams by discharging and exciting a laser medium accommodated in the laser chamber; a first resonator for amplifying the molecule fluorine spontaneous emission beams by moving the molecule fluorine spontaneous emission beams back and forth on a path that sandwiches the laser chamber: and a line narrowing element, disposed on the path, for narrowing the molecule fluorine spontaneous emission beams by transmitting therethrough or reflecting thereat the molecule fluorine spontaneous emission beams to thereby narrow a line width and select a wavelength; wherein:

the molecule fluorine spontaneous emission beams comprise two emission beams having different wavelengths and light intensities:

the first resonator and the line narrowing element amplify and line-narrow one of the two emission beams: and wherein:

the line-narrowed molecule fluorine laser apparatus further comprises:

a second resonator for moving one of the two emission beams back and forth on a path whose angle being different from that of the path of the first resonator;

taking means for taking the emission beams moved back and forth on the path of the second resonator out of the path of the second resonator;

detection means for detecting a difference between a center wavelength of the narrowed oscillation line that has been amplified and narrowed by the first resonator and the line narrowing element and a center wavelength of the emission beams taken out of the path of the second resonator by the taking means; and control means for controlling the line narrowing element so that the difference in the center wavelength by the detection means falls within the allowable range.

6. The line-narrowed molecule fluorine laser apparatus according to claim 5, wherein the detection means comprises a spectroscope for receiving the narrowed oscillation line that has been amplified and narrowed by the first resonator and the line narrowing element and the emission beams taken out of the path of the second resonator by the taking means, and measuring spectrums of those two incident lights.

7. The line-narrowed molecule fluorine laser apparatus according to claim 6, wherein the spectroscope has a scanning Fabry-Perot etalon.

8. A wavelength detection device used in a line-narrowed laser apparatus which outputs a narrowed oscillation line that has been amplified and narrowed and which comprises a laser chamber for generating spontaneous emission beams by discharging and exciting a laser medium accommodated in the laser chamber; a resonator for amplifying the spontaneous emission beams by moving the spontaneous emission beams back and forth on a path that sandwiches the laser chamber; and a line narrowing element, disposed on the path, for narrowing the spontaneous emission beams by transmitting therethrough or reflecting thereat the spontaneous emission beams to thereby narrow a line width and select a wavelength, the wavelength detection device being arranged for detecting, on the basis of a wavelength of a reference light, a wavelength of the narrowed oscillation line, wherein;

the wavelength detection device comprises:

installation angle changing means for changing, during a certain time only, an installation angle of the line narrowing element to an installation angle at which the spontaneous emission beams generated by the laser chamber are not line-narrowed; and wherein:

the spontaneous emission beams transmitted through or reflected at the line narrowing element whose installation angle having been changed by the installation angle changing means are taken out of the path and, of the taken-out spontaneous emission beams, a spontaneous emission beam whose wavelength approximates the narrowed oscillation line and whose light intensity is a certain level or higher, is used as the reference light.

* * * * *